(12) United States Patent
No et al.

(10) Patent No.: US 12,045,408 B2
(45) Date of Patent: Jul. 23, 2024

(54) DISPLAY DEVICE AND PORTABLE TERMINAL INCLUDING SAME

(71) Applicant: Samsung Display Co., Ltd., Yongin-Si (KR)

(72) Inventors: Youngsoo No, Seoul (KR); Yeontae Kim, Yonginsi (KR); Jungsu Kim, Cheonan-si (KR); Hwan-hee Jeong, Cheonansi (KR); Inyoung Han, Hwaseong-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/139,400

(22) Filed: Apr. 26, 2023

(65) Prior Publication Data

US 2023/0266836 A1    Aug. 24, 2023

Related U.S. Application Data

(63) Continuation of application No. 17/859,775, filed on Jul. 7, 2022, now Pat. No. 11,669,185, which is a
(Continued)

(30) Foreign Application Priority Data

Jul. 14, 2016    (KR) .................. 10-2016-0089409

(51) Int. Cl.
  *G06F 3/041*    (2006.01)
  *G06F 3/0354*   (2013.01)
  *G06F 3/044*    (2006.01)

(52) U.S. Cl.
  CPC ........ *G06F 3/0412* (2013.01); *G06F 3/03545* (2013.01); *G06F 3/0445* (2019.05);
(Continued)

(58) Field of Classification Search
  None
  See application file for complete search history.

(56) References Cited

U.S. PATENT DOCUMENTS 8,933,898 B2    1/2015  Lee et al.
9,665,203 B2    5/2017  Xu et al.
(Continued)

FOREIGN PATENT DOCUMENTS

CN    102736291 A    10/2012
CN    103257769 A    8/2013
(Continued)

*Primary Examiner* — Nicholas J Lee
(74) *Attorney, Agent, or Firm* — Innovation Counsel LLP

(57) ABSTRACT

Provided is a display device including a display panel including an active region and a peripheral region adjacent to the active region, n first touch sensors which are arranged successively along a first direction, extend in a second direction, each include a plurality of first connecting parts and a plurality of first sensor parts connected through the first connecting parts, and each generate an electric field together with an external touch pen; m second touch sensors which are insulated from the n first touch sensors, extend successively along the first direction, are arranged in the second direction, each include a plurality of second connecting parts and a plurality of second sensor parts connected through the second connecting parts, and each generate an electric field together with an external touch pen.

14 Claims, 17 Drawing Sheets

Related U.S. Application Data continuation of application No. 17/180,902, filed on Feb. 22, 2021, now Pat. No. 11,416,092, which is a continuation of application No. 15/641,023, filed on Jul. 3, 2017, now Pat. No. 10,928,939.

(52) U.S. Cl.
 CPC .............. *G06F 2203/04106* (2013.01); *G06F 2203/04107* (2013.01)

(56) References Cited

U.S. PATENT DOCUMENTS

| | | | |
|---|---|---|---|
| 9,857,616 | B2 | 1/2018 | Kim et al. |
| 10,019,111 | B2 | 7/2018 | Kurashima |
| 10,152,147 | B2 | 12/2018 | Choi et al. |
| 10,345,944 | B2 | 7/2019 | Lee et al. |
| 2009/0251431 | A1 | 10/2009 | Lee et al. |
| 2010/0182275 | A1 | 7/2010 | Saitou |
| 2011/0090159 | A1* | 4/2011 | Kurashima ........... G06F 3/0445 200/600 |
| 2011/0227858 | A1 | 9/2011 | An et al. |
| 2012/0062507 | A1 | 3/2012 | Kim et al. |
| 2012/0120011 | A1 | 5/2012 | Teng et al. |
| 2013/0076692 | A1* | 3/2013 | Saitou .................. G06F 3/0412 345/174 |
| 2014/0184568 | A1* | 7/2014 | Kim ..................... G06F 3/0412 345/175 |
| 2015/0084888 | A1 | 3/2015 | Han et al. |
| 2015/0103040 | A1 | 4/2015 | Huang et al. |
| 2016/0103549 | A1 | 4/2016 | Lee et al. |
| 2016/0139706 | A1 | 5/2016 | Lee et al. |
| 2017/0192610 | A1 | 7/2017 | Park et al. |

FOREIGN PATENT DOCUMENTS

| | | |
|---|---|---|
| CN | 104571848 A | 4/2015 |
| CN | 105425403 A | 3/2016 |
| CN | 105630230 A | 6/2016 |
| EP | 2746906 A1 | 6/2014 |
| JP | 2011090430 | 5/2011 |
| KR | 10-20110104349 A | 9/2011 |
| KR | 10-2014-0127450 A | 4/2013 |
| KR | 10-20130046263 A | 5/2013 |
| KR | 10-2013-0124814 A | 10/2013 |
| KR | 10-2014-0025134 A | 3/2014 |
| KR | 10-2014-0041624 A | 4/2014 |
| KR | 10-2014-0077392 A | 6/2014 |
| KR | 10-2014-0120409 A | 9/2014 |
| KR | 10-2014-0121185 A | 9/2014 |
| KR | 10-2015-0045288 A | 4/2015 |
| KR | 10-2015-0103552 A | 9/2015 |
| KR | 10-2015-0116932 A | 10/2015 |
| KR | 10-2016-0000242 A | 1/2016 |
| KR | 10-2016-0031135 A | 3/2016 |
| KR | 10-2016-0031295 A | 3/2016 |
| KR | 10-20160025440 A | 3/2016 |
| KR | 10-20160057575 A | 5/2016 |

* cited by examiner

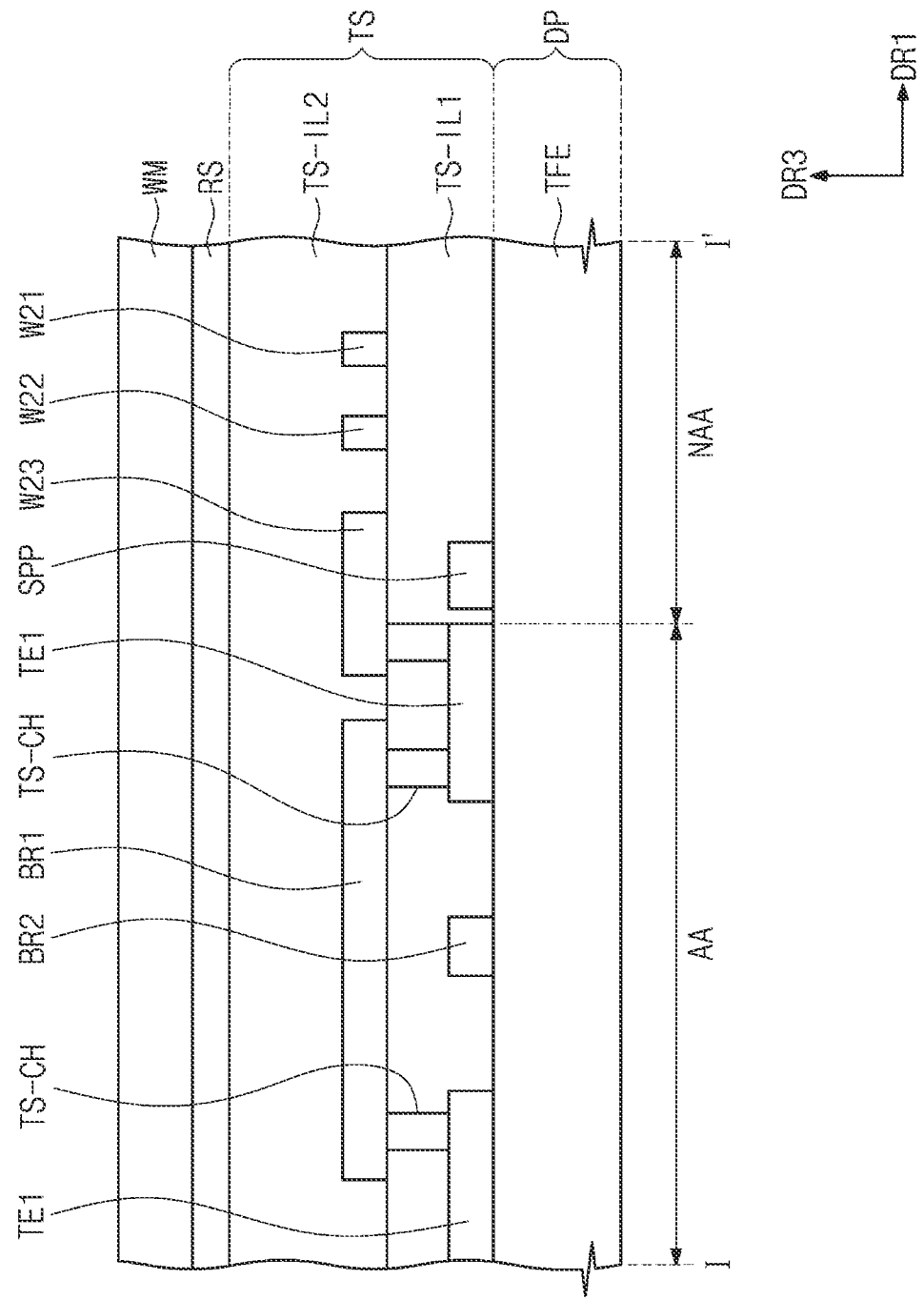

DISPLAY DEVICE AND PORTABLE TERMINAL INCLUDING SAME

CROSS-REFERENCE TO RELATED APPLICATION

This U.S. non-provisional patent application is a continuation application of U.S. patent application Ser. No. 17/859,775 filed on Jul. 7, 2022, which is a continuation application of U.S. patent application Ser. No. 17/180,902 filed on Feb. 22, 2021 (now U.S. Pat. No. 11,416,092), which is a continuation application of U.S. patent application Ser. No. 15/641,023 filed on Jul. 3, 2017 (now U.S. Pat. No. 10,928,939), which claims priority under 35 USC § 119 to Korean Patent Application No. 10-2016-0089409, filed on Jul. 14, 2016, the entire contents of which are hereby incorporated by reference.

BACKGROUND

The present disclosure herein relates generally to a portable terminal, and more particularly, to a portable terminal including a display device.

Electronic apparatuses such as smartphones, laptop computers, and smart televisions have been developed. Such electronic devices are provided with display devices to provide information.

Some recent display devices may include a touch detection function capable of interacting with users in addition to its image display function. The touch detecting function determines whether and where an object touches a screen when a user's finger, a touch pen, or the like contacts or approaches the screen. The display device may receive an image signal on the basis of such touch coordinates.

SUMMARY

Embodiments of the present disclosure provide a display device including a touch sensing unit in which connection parts connecting sensor parts are disposed adjacent to a peripheral region in an active region, and a portable terminal including the same.

Embodiments of the present disclosure also provide a display device including a blocking electrode which prevents electrical coupling between the sensor parts and signal lines, and a portable terminal including the same.

An embodiment of the inventive concept provides a display device including: a display panel including an active region and a peripheral region adjacent to the active region; n first touch sensors which are arranged successively along a first direction and extend in a second direction, each of the n first touch sensors including a plurality of first connecting parts and a plurality of first sensor parts connected through the first connecting parts, and configured to generate an electric field together with an external touch pen; m second touch sensors which are insulated from the n first touch sensors, extend in the first direction, and are arranged successively along the second direction, each of the m second touch sensors including a plurality of second connecting parts and a plurality of second sensor parts connected through the second connecting parts, and being configured to generate an electric field together with the external touch pen; and a plurality of signal lines configured to transmit a detection signal for detecting an input point of the touch pen to the n first touch sensors and the m second touch sensors, wherein the first sensor parts of the first touch sensor and the nth first touch sensor, which are disposed adjacent to the peripheral region, have the same shape as at least a portion of the second first sensor parts included in the first touch sensor to the (n−1)th first touch sensor; and the second sensor parts of the first second touch sensor and mth second touch sensor, which are disposed adjacent to the peripheral region, have the same shape as at least a portion of the second sensor parts included in the second touch sensor to the (m−1)th second touch sensor.

In an embodiment, the display device may further include a blocking electrode disposed in the peripheral region, wherein ends of the signal lines may be respectively connected to the n first touch sensors and the m second touch sensors, and the blocking electrode may be disposed adjacent to the one ends of the signal lines connected to the first and second touch sensors.

In an embodiment, the signal lines may include a plurality of first to fourth signal lines, wherein ends of the first signal lines may be respectively connected to ends of the n first touch sensors, ends of the second signal lines may be respectively connected to the other ends of the n first touch sensors; ends of the third signal lines may be respectively connected to ends of the m second touch sensors, and ends of the fourth signal lines may be respectively connected to other ends of the m n second touch sensors.

In an embodiment, the blocking electrode may be disposed in the peripheral region and adjacent to ends of the first to fourth signal lines so as to surround the active region.

In an embodiment, ends of the signal lines may be respectively connected to the first and second connecting parts.

In an embodiment, the first connecting parts and the signal lines may be directly disposed on the display panel.

In an embodiment, the first sensor parts, the second sensor parts, the second connecting parts, and the blocking electrode may be disposed on a layer different from a layer on which the first connecting parts and the signal lines are disposed.

In an embodiment, a first insulating layer may be disposed on the first connecting parts and the signal lines, and the first sensor parts, the second sensor parts and the second connecting parts may be disposed on the first insulating part.

In an embodiment, the first sensor parts, the second sensor parts, the second connecting parts and the blocking electrode may be directly disposed on the display panel.

In an embodiment, the first connecting parts and the signal lines may be disposed on a layer different from on which the first sensor parts, the second sensor parts, the second connecting parts, and the blocking electrode are disposed.

In an embodiment, the display panel may include: a base substrate; a plurality of organic light-emitting elements disposed on the base substrate; and an encapsulating substrate encapsulating the organic light-emitting elements and disposed on the base substrate, wherein the n first touch sensors and the m second touch sensors may be disposed on the encapsulating substrate.

An embodiment of the inventive concept provides a portable terminal including: a display device and a touch pen for selecting information displayed on the display device, the display device including: a display panel including an active region and a peripheral region adjacent to the active region; n first touch sensors arranged in a first direction and extending in a second direction, each of the n first touch sensors including a plurality of first connecting parts and a plurality of first sensor parts connected through the first connecting parts, the plurality of first sensor parts being configured to generate an electric field with an external touch pen; m second touch sensors insulated from the n first touch sensors, extending in the first direction, and arranged successively along the second direction, each of the m first touch sensors including a plurality of second connecting parts and a plurality of second sensor parts connected through the second connecting parts, the plurality of second sensor parts being configured to generate an electric field with an external touch pen; and a plurality of signal lines configured to transmit a detection signal for detecting an input point of the touch pen to the n first touch sensors and the m second touch sensors, wherein the first sensor parts of the first touch sensor and the nth first touch sensor, which are disposed adjacent to the peripheral region, have the same shape as at least a portion of the first sensor parts included in the second first touch sensor and the (n−1)th first touch sensor; and the second sensor parts of the first second touch sensor and the mth second touch sensor, which are disposed adjacent to the peripheral region, have the same shape as at least a portion of the second sensor parts included in the second touch sensor and the (m−1)th second touch sensor.

In an embodiment, the display device may further include a blocking electrode disposed in the peripheral region, wherein ends of the signal lines may be respectively connected to the n first touch sensors and the m second touch sensors, and the blocking electrode may be disposed adjacent to the ends of the signal lines connected to the first and second touch sensors.

In an embodiment, the first connecting parts and the signal lines may be directly disposed on the display panel.

In an embodiment, the first sensor parts, the second sensor parts, the second connecting parts, and the blocking electrode may be disposed on a layer different from a layer on which the first connecting parts and the signal lines are disposed.

In an embodiment, the touch pen may include a detecting part for contacting a touch coordinate of the display device, wherein the detecting part may be configured to generate an electric field with each of the n first touch sensors and the m second touch sensors.

In an embodiment, the detecting part may include a metal.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 7C is a cross-sectional view of the touch sensing unit illustrated in FIG. 6A;

DETAILED DESCRIPTION

Figure 1:
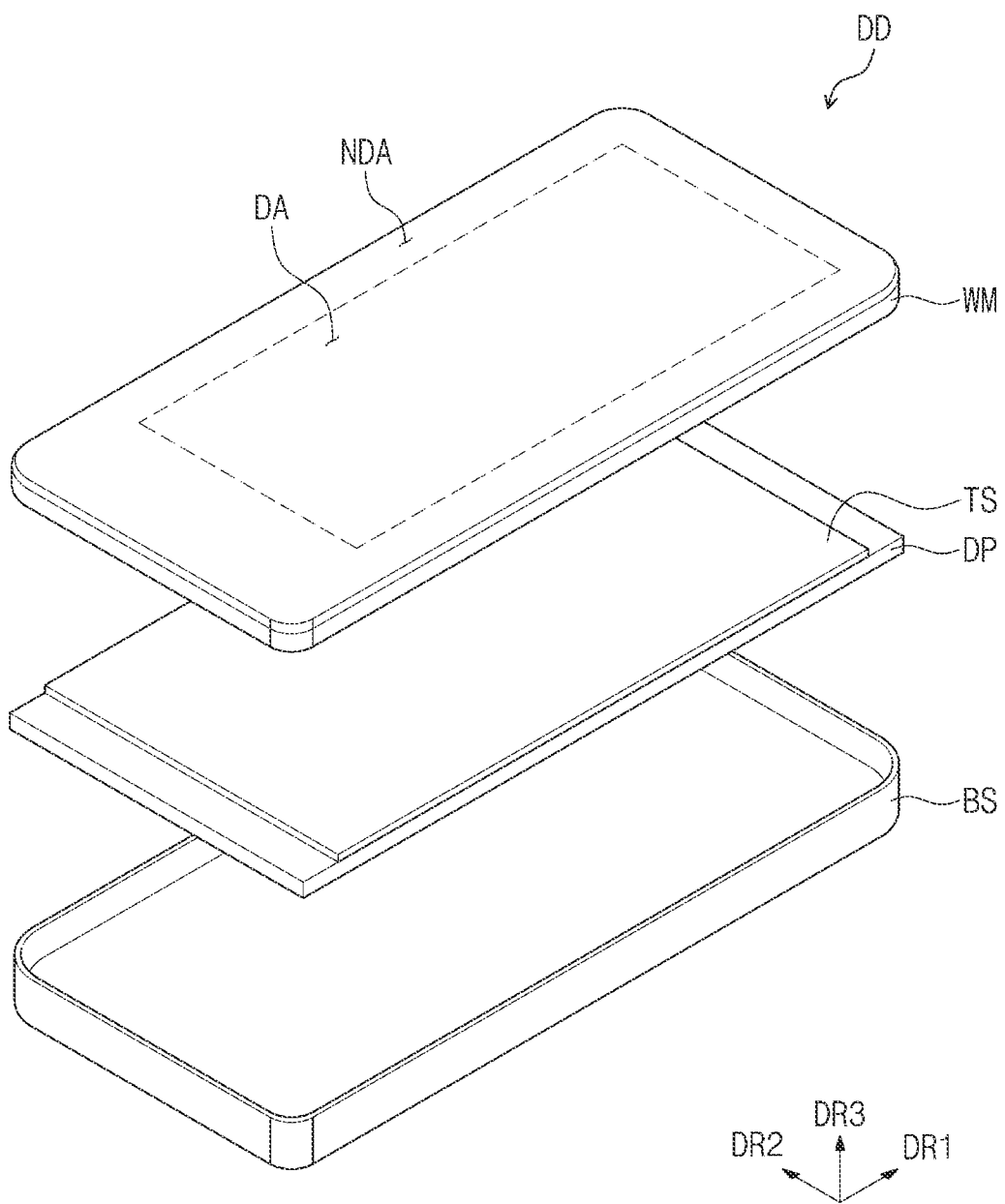
FIG. 1 is a block diagram of a portable terminal according to an embodiment of the inventive concept.

The inventive concept may be modified in many alternate forms, and thus specific embodiments will be exemplified in the drawings and described in detail. It should be understood, however, that it is not intended to limit the inventive concept to the particular form disclosed, but rather, and the inventive concept is to cover various modifications and equivalent arrangements included within the spirit and scope of the disclosure, including the appended claims.

In describing the drawings, like reference numerals refer to like elements throughout. In the drawings, the dimensions and size of each structure are exaggerated, omitted, or schematically illustrated for convenience in description and clarity. The various drawings are thus not necessarily to scale. It will be understood that although the terms of first and second are used herein to describe various elements, these elements should not be limited by these terms. Terms are only used to distinguish one component from other components. For example, an element referred to as a first element in one embodiment can be referred to as a second element in another embodiment. The terms of a singular form may include plural forms unless referred to the contrary.

The meaning of 'include' or 'comprise' specifies a property, a region, a fixed number, a step, a process, an element and/or a component but does not exclude other properties, regions, fixed numbers, steps, processes, elements and/or components. All numerical values are approximate, and may vary. All examples of specific materials and compositions are to be taken as nonlimiting and exemplary only. Other suitable materials and compositions may be used instead.

Figure 2A:
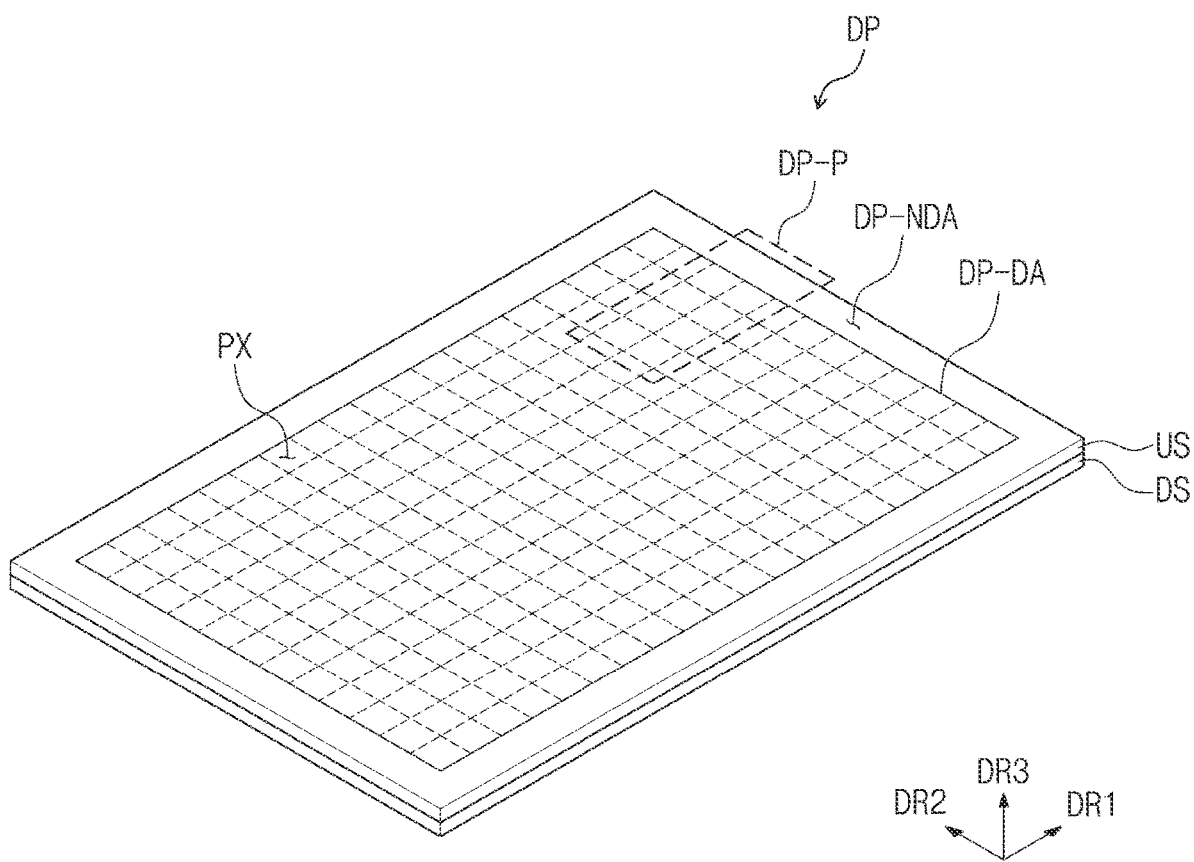
FIG. 2A is a plan view of the display panel illustrated in FIG. 1.
Figure 2B:
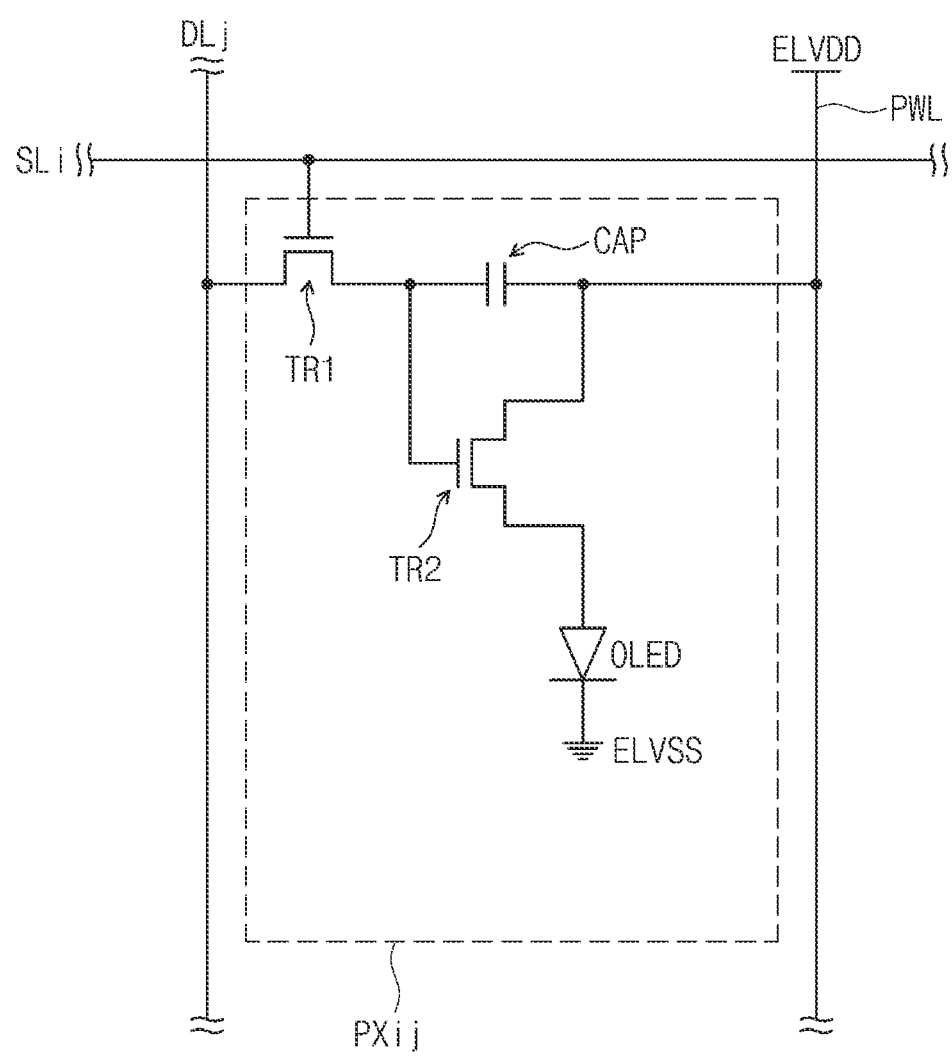
FIG. 2B is an equivalent circuit diagram of one pixel illustrated in FIG. 2A.
Figure 2C:
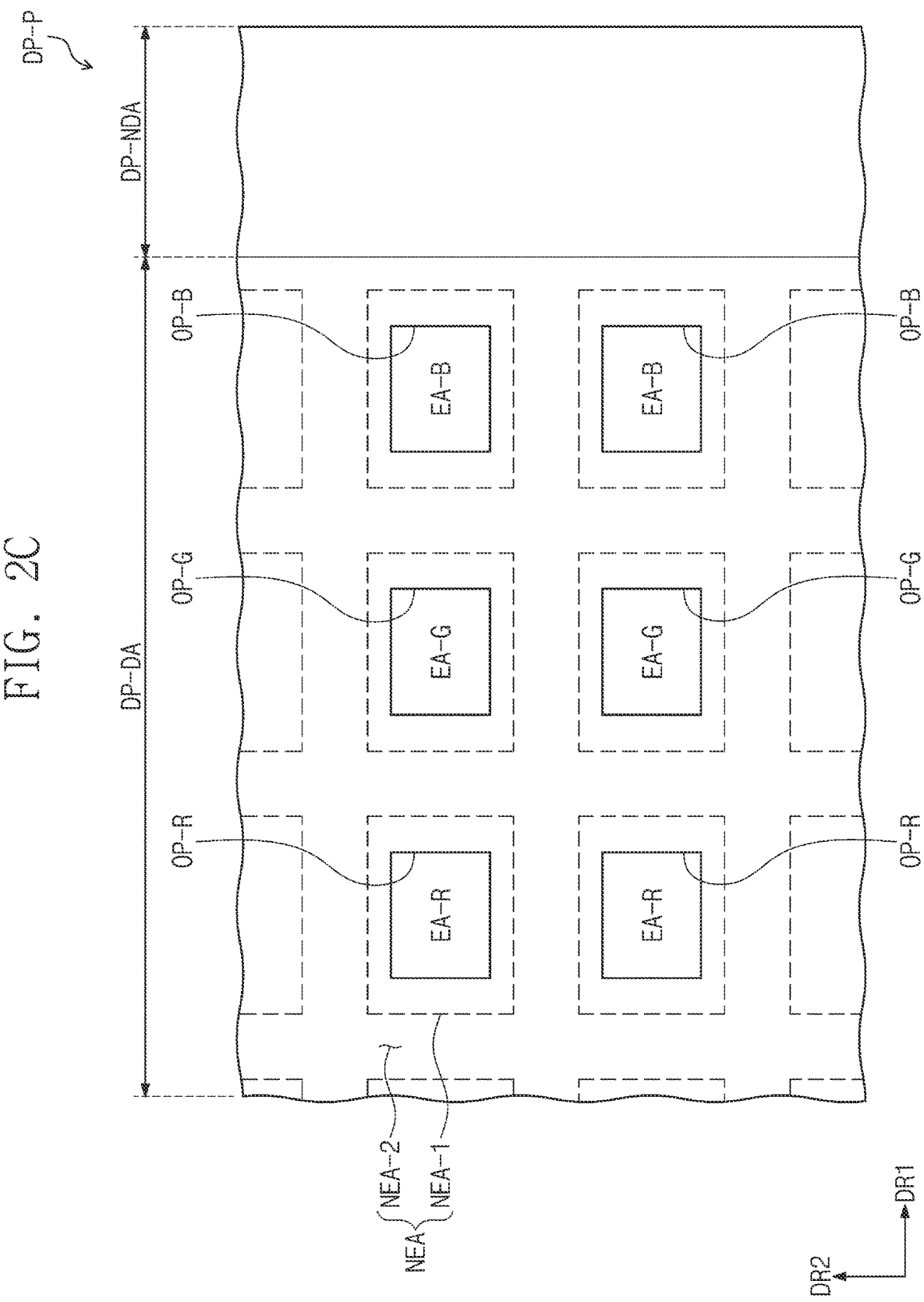
FIG. 2C is a partial plan view of the display panel illustrated in FIG. 2A.
Figure 2D:
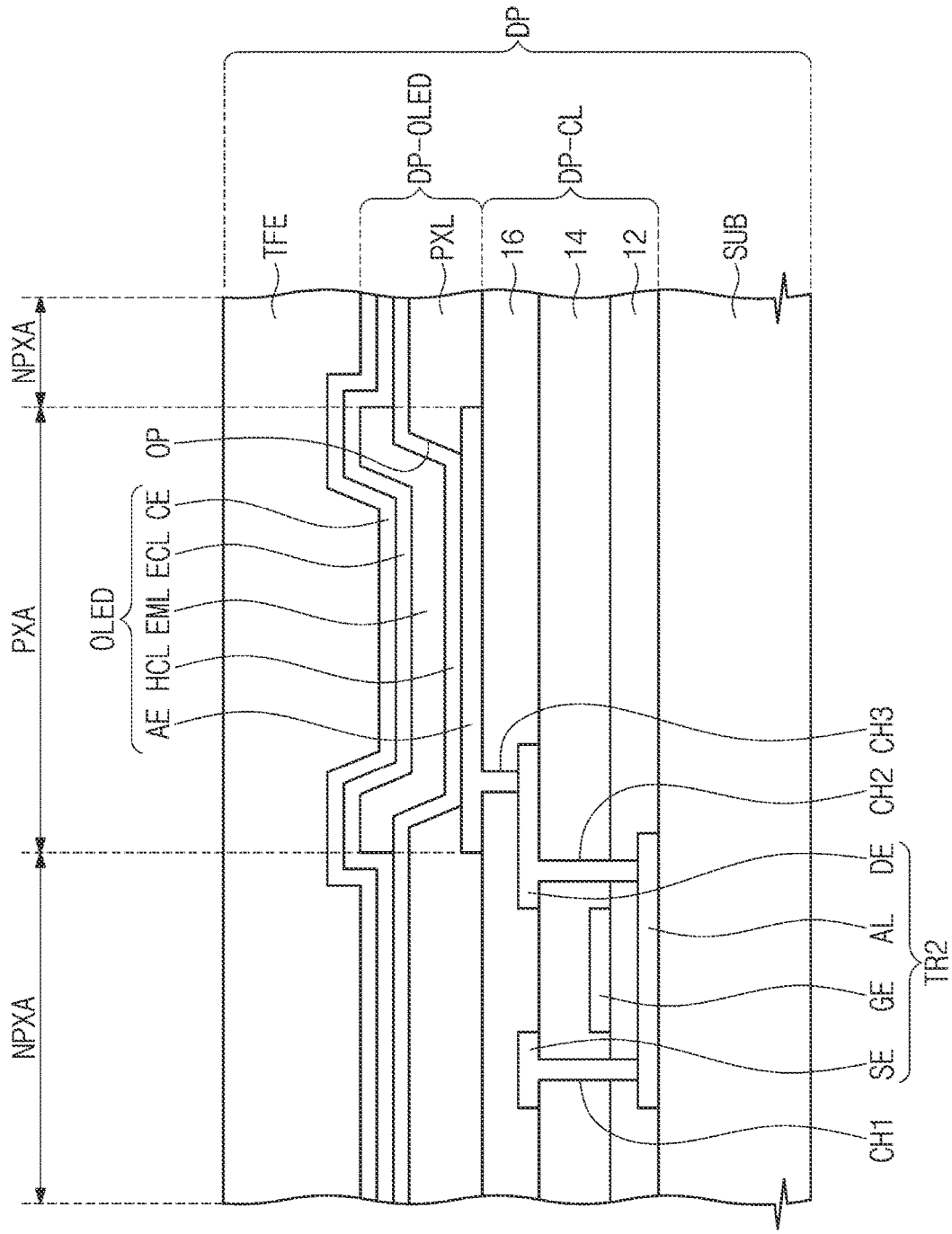
FIG. 2D is a partial plan view of the display panel illustrated in FIG. 2A.

FIG. 1 is a block diagram of a portable terminal according to an embodiment of the inventive concept. FIG. 2A is a plan view of a display panel illustrated in FIG. 1. FIG. 2B is an equivalent circuit diagram of one pixel illustrated in FIG. 2A. FIG. 2C is a partial plan view of a display panel illustrated in FIG. 2A. FIG. 2D is a partial plan view of a display panel illustrated in FIG. 2A.

According to an embodiment of the inventive concept, the portable terminal DD illustrated in FIG. 1 may be applied to tablet PCs, smartphones, personal digital assistants (PDAs), portable multimedia players (PMPs), game consoles, wrist watch type electronic apparatuses, and the like. These are merely examples and embodiments may, of course, be applied to other electronic devices unless departing from the inventive concept. Substantially, the portable terminal DD may be a display device. Hereinafter, the portable terminal DD will be described as a display device DD.

The display device DD includes a display area DA on which an image is displayed and a non-display area NDA adjacent to the display area DA. The non-display area NDA may surround the display area DA.

Referring to FIG. 1, the display device DD may include a window member WM, a display panel DP, a touch sensing unit TS, and a receiving member BC.

The window member WM is disposed over the touch sensing unit TS, and may transmit an image provided from the display panel DP through the display region DA. For example, the window member may be configured from glass, sapphire, plastic, or the like.

As illustrated in FIG. 1, although the window member WM is illustrated as a single layer, the window member WM may include a plurality of layers. For example, the window member WM may include at least one bezel layer disposed on a lower surface of a supporting layer.

According to an embodiment of the inventive concept, the display panel DP may be a liquid crystal display panel, an organic light-emitting display panel, an elctrophoretic display panel, an electrowetting display panel, or the like, and the type thereof is not limited. Hereinafter, according to the description of the inventive concept, an organic light-emitting display panel is exemplarily described.

Referring to FIGS. 2A to 2C, the display panel DP is parallel to a surface defined by a first direction DR1 and a second direction DR2. The normal direction to the display panel DP is indicated by a third direction DR3. The third direction DR3 indicates the thickness direction of the display device DD. The front surfaces (or upper surfaces) and the lower surfaces (or rear surfaces) of members are distinguished by the third direction DR3. However, the directions indicated by the first to third directions DR1, DR2 and DR3 are relative concepts and may be converted into other directions.

The display panel DP may include a lower substrate DS and an upper substrate US. In a lower substrate DS, a plurality of pixels PX, a plurality of organic light-emitting elements OLED, and a plurality of signal lines required to drive the display device DD may be disposed. For example, the signal lines include a plurality of gate lines which extend in the second direction DR2 and are arranged in the first direction DR1. The signal lines may include a plurality of data lines which extend in the first direction DR1 and are arranged in the second direction DR2. The gate lines and the data lines respectively cross each other in an insulative manner.

However, the embodiment of the inventive concept is not limited thereto, and the gate lines may extend in the first direction DR1 and be arranged successively along the second direction DR2. In addition, the data lines may extend in the second direction DR2 and be arranged successively along the first direction DR1.

The upper substrate US is disposed on the lower substrate DS and encapsulates the organic light-emitting elements OLED included in the lower substrate DS from the outside. For example, the upper substrate US may be provided as an encapsulating substrate TFE (see FIG. 2D).

Also, the display panel DP, when viewed in plan view, may include a display region DP-DA and a non-display region DP-NDA. The display region DP-DA and the non-display region DP-NDA may have various shapes and configurations according to the structure and design of the display panel DP.

Pixels PX may be disposed in a matrix shape so as to overlap the display region DP-DA. However, the embodiment of the inventive concept is not limited thereto. The pixels PX may be disposed in a non-matrix shape, for example, in a PenTile shape.

As illustrated in FIG. 2B, an equivalent circuit of a pixel PXii connected to an ith gate line SLi and a jth data line DLi is exemplarily illustrated.

The pixel PXii includes a first thin film transistor TR1, a second thin film transistor TR2, a capacitor CAP, and an organic light-emitting element OLEDij. The first thin film transistor TR1 includes a control electrode connected to the ith scan line SLi, an input electrode connected to a jth data line DLj, and an output electrode. The first transistor TR1 outputs a data signal applied to the jth source line DLj in response to a gate signal applied to the ith scan line SLi.

The capacitor CAP includes a first capacitor electrode connected to the first thin film transistor TR1, and a second capacitor electrode receiving a first power supply voltage ELVDD. The capacitor CAP charges an amount of charge corresponding to the difference between a voltage corresponding to a data signal received from the first thin film transistor TR1 and the first power supply voltage ELVDD.

The second thin film transistor TR2 includes: a control electrode connected to the output electrode of the first thin film transistor TR1 and the first capacitor electrode of the capacitor CAP; an input electrode receiving the first power supply voltage ELVDD, and an output electrode. The output electrode of the second thin film transistor TR2 is connected to the organic light-emitting element OLEDij.

The second thin film transistor TR2 controls driving current flowing through the organic light emitting element OLEDij corresponding to the amount of charge stored in the capacitor CAP. More specifically, a turn-on time of the second thin film transistor TR2 is determined according to the amount of charge charged in the capacitor CAP. Substantially, the output electrode of the second thin film transistor TR2 provides the organic light-emitting element OLEDij with a voltage with a level lower than that of the first power supply voltage ELVDD.

The organic light emitting element OLEDij includes a first electrode connected to the second thin film transistor TR2, and a second electrode receiving a second power supply voltage ELVSS. The organic light emitting element OLEDij may include a light-emitting pattern disposed between the first and second electrodes.

The organic light emitting element OLEDij emits light during a turn-on interval of the second thin film transistor TR2. The color of light generated in the organic light emitting element OLEDij is determined by a material constituting the light-emitting pattern. For example, the color of light generated in the organic light emitting element OLEDij may be any one of red, green, blue or white.

As illustrated in FIG. 2C, the display region DP-DA is defined as a plurality of light-emitting regions EA-R, EA-G and EA-B and non-light-emitting region NEA in a plane defined by the first and second directions DR1 and DR2. FIG. 2C exemplarily illustrates three types of light-emitting regions EA-R, EA-G and EA-B which are disposed in a matrix shape. Three organic light-emitting elements which emit colors different from each other in the three types of light-emitting regions EA-R, EA-G and EA-B.

According to another embodiment of the inventive concept, organic light-emitting elements which emit white colors are present in the three types of light-emitting regions EA-R, EA-G and EA-B. Here, color filters of three types of colors different from each other may respectively overlap three types of light-emitting regions EA-R, EA-G and EA-B.

According to the description of the inventive concept, the wording "light having a predetermined color is emitted from the light-emitting region" may include not only the case in which light generated from the corresponding light-emitting element is emitted without conversion to a different color, but also the feature in which the color of light generated from the corresponding light-emitting element is converted and then emitted.

Also, although not shown, according to another embodiment of the inventive concept, a plurality of light-emitting regions EA-R, EA-G and EA-B may include four or more types of light-emitting regions.

The non-light-emitting region NEA may be divided into first non-light-emitting regions NEA-1 surrounding light-emitting regions EA-R, EA-G and EA-B and second non-light-emitting regions NEA-2 defining a border of the first non-light-emitting regions NEA-1. A driving circuit, for example the thin film transistors TFT1 and TFT2 (see FIG. 2B) or the capacitor CAP (see FIG. 2B), may be disposed in each of the first non-light-emitting regions NEA-1. In the second non-light-emitting region NEA-2, signal lines, for example the gate line SLi (see FIG. 2B) and the data line DLi (see FIG. 2B), may be disposed. However, the embodiment of the inventive concept is not limited thereto, and the first non-light emitting region NEA-1 and the second non-light emitting regions NEA-2 may not be separated from each other.

Also, although not shown, according to an embodiment of the inventive concept, the light-emitting regions EA-R, EA-G and EA-B each may have a shape similar to a rhombus. According to an embodiment, organic light-emitting elements emitting four colors different from each other may be respectively disposed in four types of light-emitting regions that form a repeating pattern.

As illustrated in FIG. 2D, a partial cross-sectional view of the display panel DP illustrated in FIG. 2A is illustrated. In particular, hereinafter, the region including second thin film transistor TR2 illustrated in FIG. 2B is exemplarily described.

The display panel DP includes a base substrate SUB, a circuit layer DP-CL, a light-emitting element layer DP-OLED and an encapsulating layer TFE. Here, the base substrate SUB may be the lower substrate DS illustrated in FIG. 2A, and the encapsulating layer TFE may be the upper substrate US.

The base substrate SUB may include a plastic substrate, a glass substrate, a metal substrate, an organic/inorganic composite material substrate, or the like. The base substrate SUB may have a multilayer structure.

The circuit layer DP-CL may include a plurality of conductive layers and a plurality of insulating layers, and the organic light-emitting element layer DP-OLED may include a plurality of conductive layers and a plurality of functional organic layers.

A semiconductor pattern AL of the thin film transistors TR2 is disposed on the base substrate SUB. A first insulating layer 12 for covering the semiconductor pattern AL is disposed on the base substrate SUB. The first insulating layer 12 includes an organic and/or inorganic layer.

A control electrode GE of the transistor TR2 is disposed on the first insulating layer 12. A second insulating layer 14 for covering the control electrode GE is disposed on the first insulating layer 12. The second insulating layer 14 includes an organic and/or inorganic layer.

An input electrode SE and an output electrode DE of the second thin film transistor TR2 are disposed on the second insulating layer 14. The input electrode SE is branched from the data line DLi. The output electrodes DE is branched from a power line PWL.

The input electrode SE and the output electrode DE are respectively connected to the semiconductor pattern AL through a first through hole CH1 and a second through hole CH2 which penetrate through the first insulating layer 12 and the second insulating layer 14. In another embodiment of the inventive concept, the second thin film transistor TR2 may be implemented with a bottom gate structure A third insulating layer 16 covering the input electrode SE and the output electrode DE is disposed on the second insulating layer 14. The third insulating layer 16 includes an organic and/or inorganic layer. In particular, the third insulating layer 16 may include an organic material to provide a flat surface.

A pixel defining film PXL and the organic light-emitting diode OLED are disposed on the third insulating layer 16. An opening part OP is defined in the pixel defining film PXL. The pixel defining film PXL serves as another insulating layer. The opening OP of FIG. 2D may correspond to opening parts OP-R, OP-G and OP-B of FIG. 2C.

The anode AE is connected to the output electrode DE through a third through hole CH3 penetrating through the third insulating layer 16. The opening part OP of the pixel defining film PXL exposes at least a portion of the anode AE. A hole control layer HCL may be provided in common in the light-emitting regions EA-R, EA-G, and EA-B and the non-light-emitting region NPXA. An organic light-emitting layer EML and an electron control layer ECL are sequentially formed on the hole control layer HCL. The hole control layer HCL includes at least a hole transport layer, and the electron control layer ECL includes at least an electron transporting layer. Hereinafter, a cathode CE may be formed in common in the light-emitting regions EAA-R, EA-G and EA-B, and the non-light-emitting region NEA.

An encapsulating substrate TFE for encapsulating the organic light-emitting element layer DP-OLED is disposed on the cathode CE. The encapsulating substrate TFE may be attached to the base substrate SUB through a sealing material. However, the embodiment of the inventive concept is not limited thereto, and a thin film encapsulating layer covering the organic light-emitting element layer DP-OLED may instead be disposed on the cathode CE. The thin film encapsulating layer includes at least two inorganic thin films and organic thin films disposed between the inorganic thin films. The inorganic thin films protect the organic light-emitting element OLED from water, and the organic thin films protect the organic light-emitting element OLED from foreign substances such as dust particles.

The touch sensing unit TS may be disposed between the display panel DP and the window member WM to detect coordinate information for an external touch. According to an embodiment of the inventive concept, the touch sensing unit TS may be provided as electrostatic capacitive type touch sensors. However, the embodiment of the inventive concept is not limited thereto, and may include touch sensing units of any one or more other types, including electromagnetic induction type or other touch electrodes.

The receiving member BC is coupled to a window member WM so as to receive the display panel DP. The receiving member BC may be formed as a plurality of portions that are assembled together, or may include one unitary body which is injection molded. The receiving member BC may include a plastic or metal.

Although the display device DD is illustrated as being flat in FIG. 1, the display device DD according to the inventive concept may be implemented as a flexible display device. That is, components such as the display panel DP and the window member WM may include flexible materials and may be bent, extended or pressed.

Figure 3:
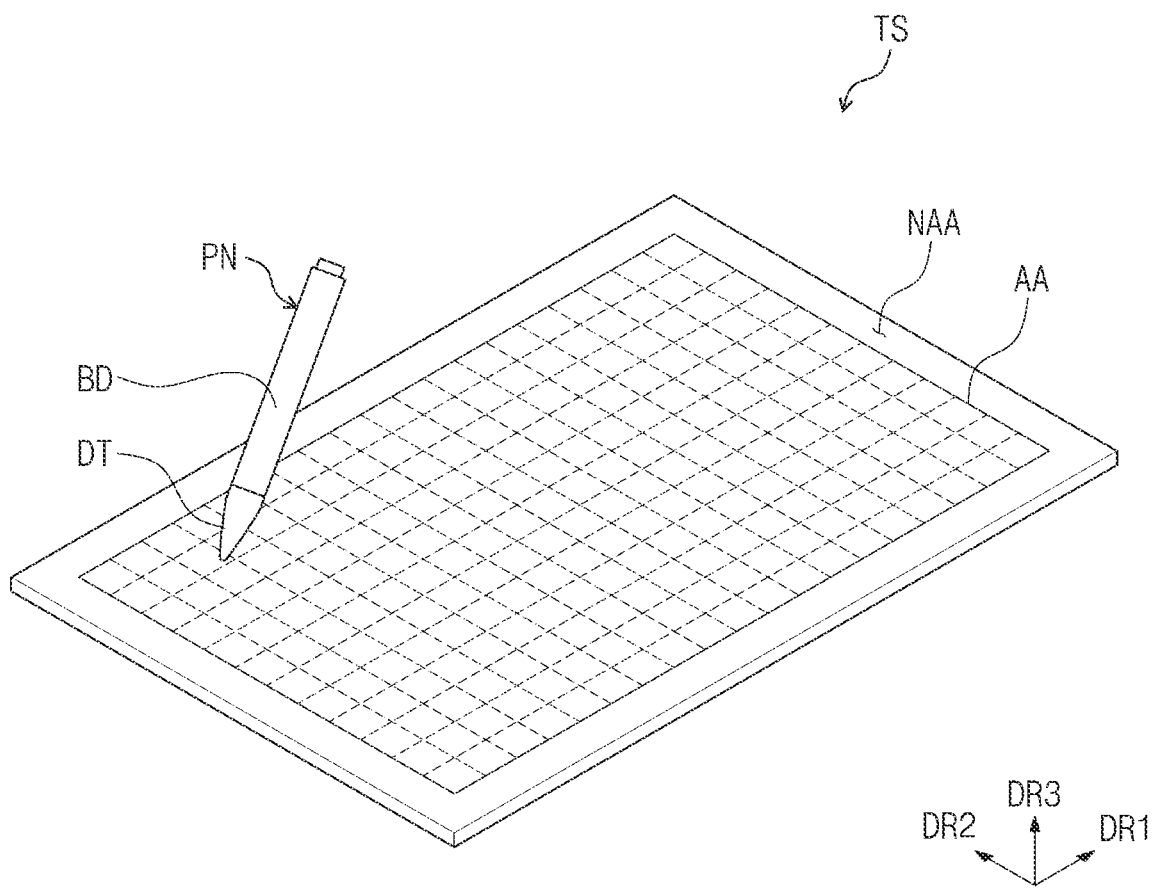
FIG. 3 is a cross-sectional view of the touch sensing unit illustrated in FIG. 1.
Figure 4:
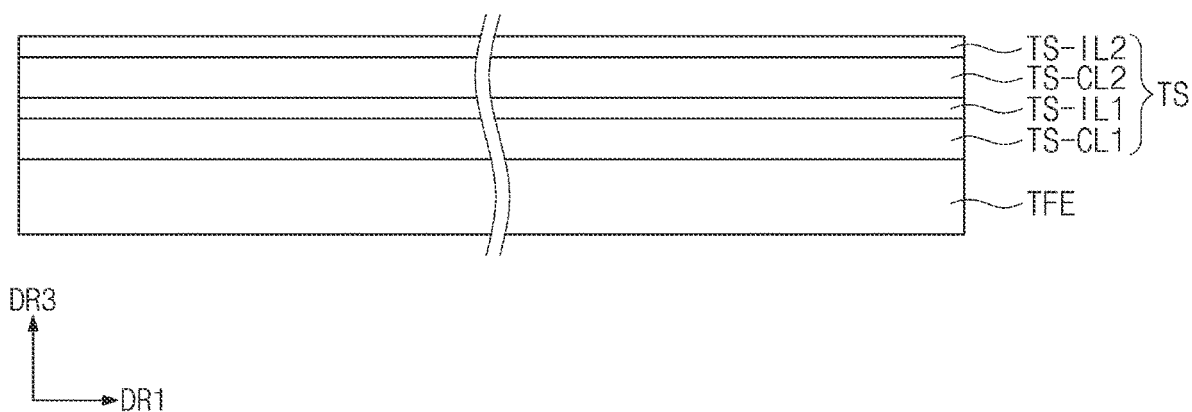
FIG. 4 is a plan view of a touch sensing unit according to an embodiment of the inventive concept.

FIG. 3 is a view illustrating a touch sensing unit and a pen according to an embodiment of the inventive concept. FIG. 4 is a cross-sectional view of the touch sensing unit illustrated in FIG. 3.

First, referring to FIGS. 3 and 4, a touch sensing unit TS may include an active region AA and a peripheral region NAA. Here, the active region AA may correspond to the display region DP-DA of the display panel DP illustrated in FIG. 2, and the peripheral region may correspond to the non-display region DP-NDA of the display panel DP. The peripheral region NAA is defined as being adjacent to the active region AA. For example, the peripheral region NAA may have a frame shape surrounding the active region AA. The touch sensing unit TS does not detect an external touch applied to the peripheral region NAA.

Specifically, the touch detecting unit TS may include a first conductive layer TS-CL1, a first insulating layer TS-IL1, a second conductive layer TS-CL2, and a second insulating layer TS-IL2.

Each of the first conductive layer TS-CL1 and the second conductive layer TS-CL2 may have a single layer structure or may have a multilayer structure successively laminated in a third direction DR3. The multilayer-structured conductive layer may have at least one metal layer. The multilayer-structured conductive layer may include metal layers with differing conductors, i.e. transparent conductors and/or metals. The transparent conductive layers may include indium tin oxide (ITO), indium zinc oxide (IZO), zinc oxide (ZnO), indium tin zinc oxide (ITZO), PEDOT, metal nanowires, or graphene. The metal layers may include molybdenum, silver, titanium, copper, aluminum, and alloys thereof.

Each of the first conductive layer TS-CL1 and the second conductive layer TS-CL2 includes a plurality of patterns. Hereinafter, it will be described that the first conductive layer TS-CL1 includes first conductive patterns, and the second conductive layer TS-CL2 includes second conductive patterns. Each of the first conductive patterns and the second conductive patterns may include a touch electrode and touch signal lines.

Each of the first insulating layer TS-IL1 and the second insulating layer TS-IL2 may include an inorganic or organic material. The inorganic material may include silicon oxide or silicon nitride. The organic material may include at least any one of an acryl-based resin, a methacryl-based resin, a polyisoprene-based resin, an epoxy-based resin, a urethane-based resin, a cellulose-based resin, or parylene-based resin.

The first insulating layer TS-IL1 insulates the first conductive layer TS-CL1 from the second conductive layer TS-CL2, and the shape thereof is not limited. According to the shapes of the first conductive patterns and the second conductive patterns, the shape of the first insulating layer TS-IL1 may be changed. The first insulating layer TS-IL1 may entirely cover the encapsulating layer TFE (see FIG. 2D) or include a plurality of insulating patterns.

According to descriptions of the inventive concept, a two-layered electrostatic capacitive touch screen is exemplarily illustrated. However, the touch sensing unit TS may be driven through a self capacitance method, and the method for driving a touch screen for obtaining coordinate information is not particularly limited.

According to an embodiment of the inventive concept, the touch sensing unit TS may detect a touch coordinate on the basis of the movement of a touch pen PN. The touch pen PN includes a body part BD and detection part DT connected to an end of the body part BD. Although not shown, the body part BD may include a power supply part and provide power to the detecting part DT of the touch pen PN. The detecting part DT may correspond to a general pen point and may be provided as a conductor such as a metal. The detecting part DT may respond to power provided from the body part BD and may thus generate an electric field with surrounding metallic objects.

In operation, when the touch pen PN contacts or approaches the touch sensing unit TS, a touch coordinate is detected by the touch sensing unit TS, but the embodiment of the inventive concept is not limited thereto. Here, the contact may include both a touch and an approach between two objects. That is, the touch sensing unit TS according to the inventive concept may recognize the touch coordinate by means of not only the touch pen PN but also various methods such as a contact of a user's body.

When the detecting part DT of the touch pen PN contacts or approaches the touch sensing unit TS at a touch coordinate, the detecting part DT may generate an electric field to trigger sensors included in the touch sensing unit TS. Here, the magnitudes of voltages provided to the detecting part DT and to the touch sensors may be different from each other. As the magnitudes of voltages provided to the detecting part DT and to the touch sensors are different from each other, a voltage difference may be generated. Due to such voltage difference, an electric field may be generated between the detecting part DT and the touch sensors. The touch sensing unit TS may detect the touch coordinates on the basis of the magnitude of the electric field between the detecting part DT and the touch sensors.

A touch recognition ratio is decreased in the vicinity of an edge of the active region AA as compared to the vicinity of a central portion in the active region AA. The touch sensing unit TS according to the inventive concept may improve the touch recognition ratio in the vicinity of the edge of the active region AA.

Figure 5A:
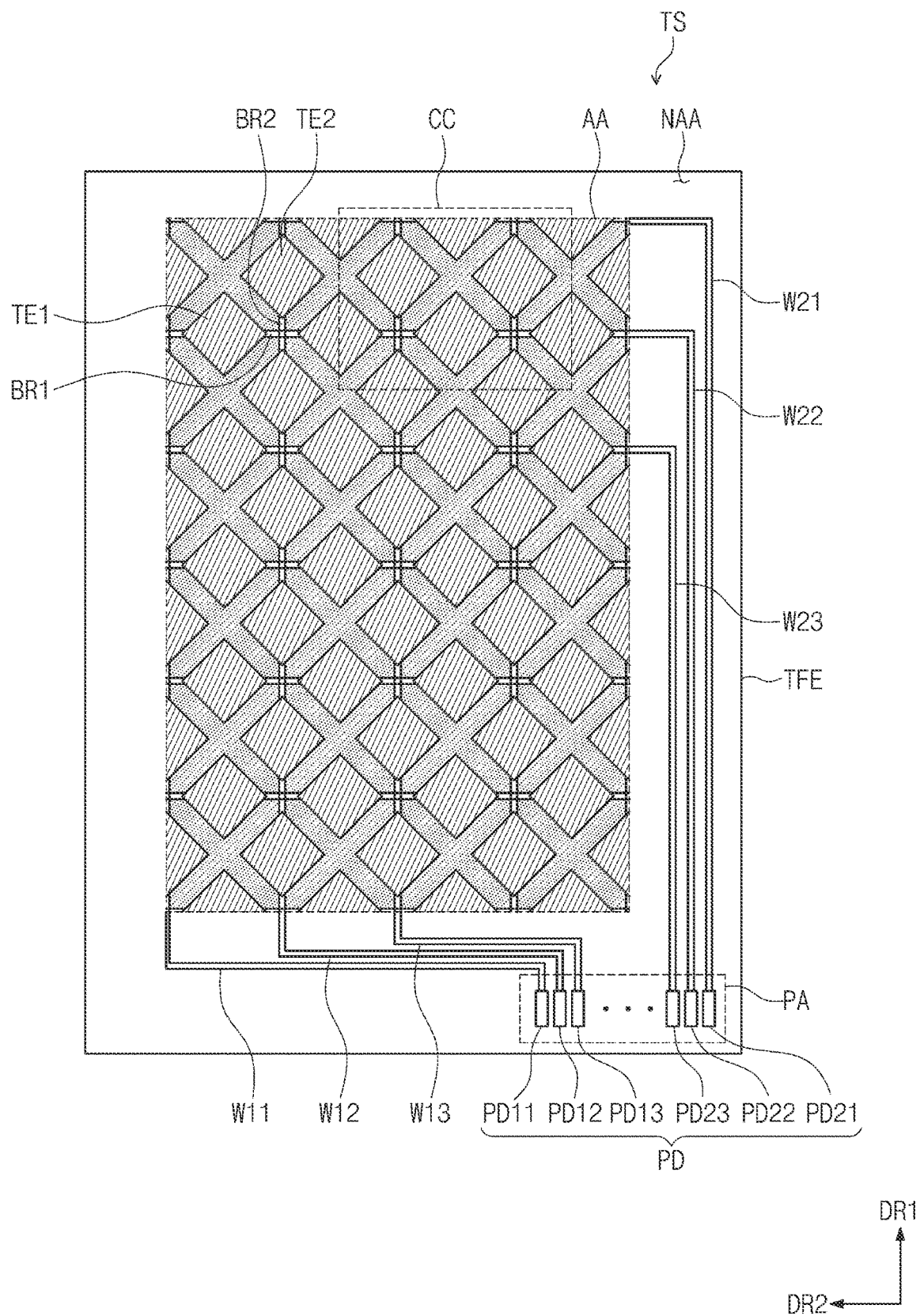
FIG. 5A is a view illustrating a touch pen providing an input signal to the touch sensing unit illustrated in FIG. 4.
Figure 5B:
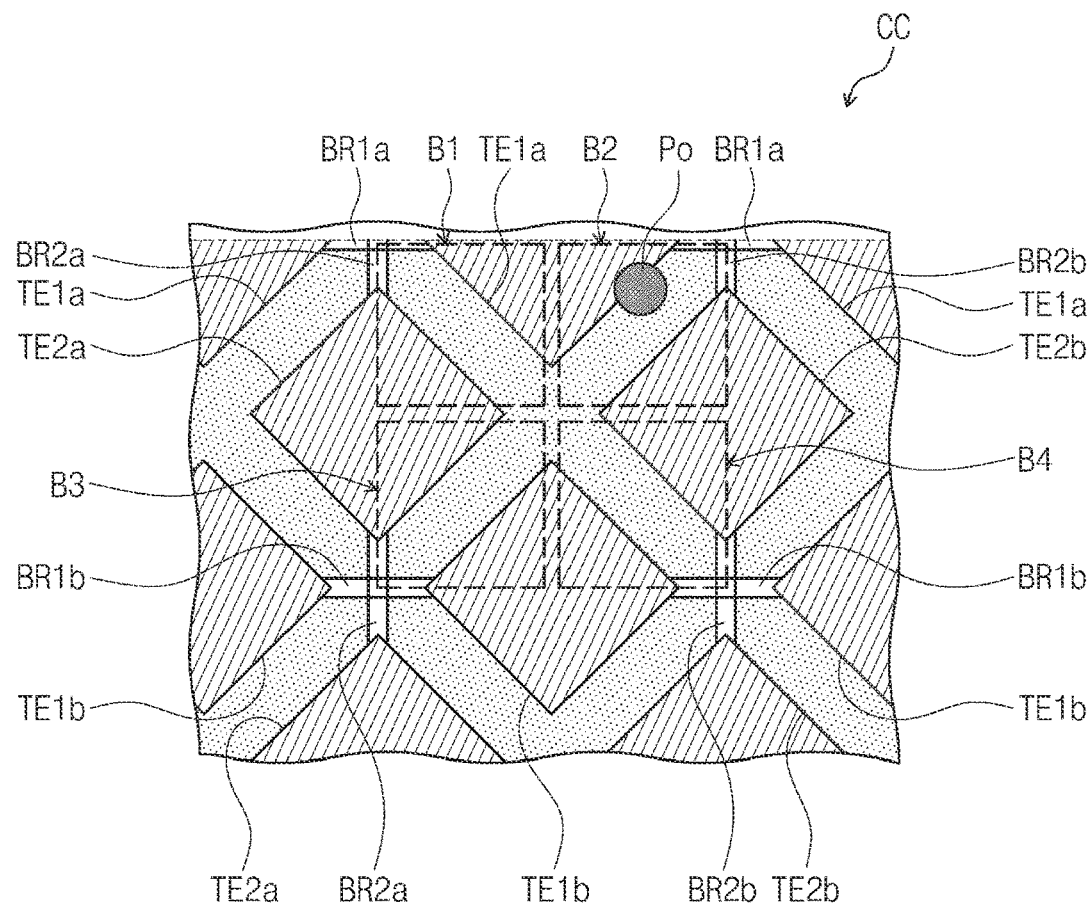
FIG. 5B is an enlarged view of region CC illustrated in FIG. 4.
Figure 5C:
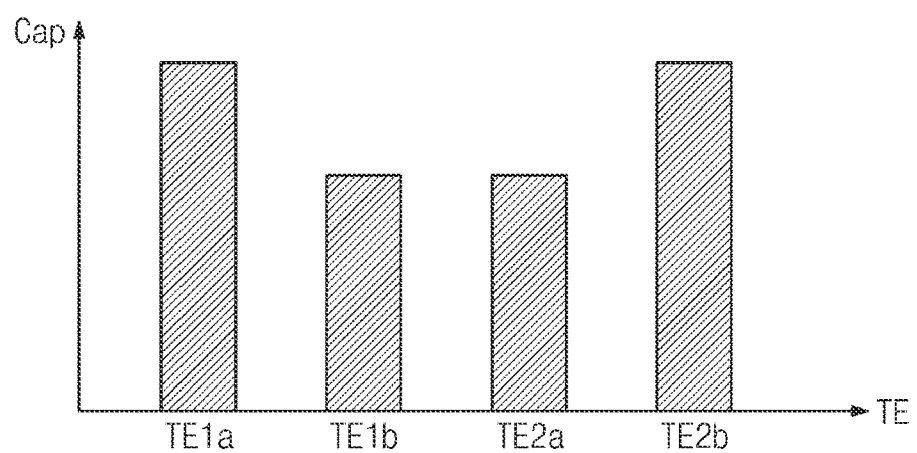
FIG. 5C is a graph illustrating a change in a detected signal according to an input signal illustrated in FIG. 5B.

FIG. 5A is a plan view of a touch sensing unit according to an embodiment of the inventive concept. FIG. 5B is an enlarged view of region CC illustrated in FIG. 5A. FIG. 5C is a graph illustrating a change in a detected signal according to input signals illustrated in FIG. 5B.

First, referring to FIG. 5A, the touch sensing unit TS includes a plurality of first touch sensors, a plurality of second touch sensors, a plurality of signal lines W11, W12, W13, W21, W22 and W23, and a plurality of pads PD.

The first and second touch sensors are disposed in an active region AA. Each of the first touch sensors is arranged successively along a first direction DR1, and may have a shape extending in a second direction DR2. Each of the first touch sensors may include a plurality of first sensor parts TE1 and a plurality of first connecting parts BR1 connecting the first sensor parts TE1. For example, n number of the first touch sensors are provided and arranged successively along the first direction DR1. Here, n is a natural number. Hereinafter, the n first touch sensors are described as the first touch sensors.

According to an embodiment of the inventive concept, a first touch sensor and nth first touch sensor may be disposed closest to a peripheral region NAA. As illustrated in FIG. 5A, the first touch sensor and the nth first touch sensor are disposed closest to the peripheral region NAA while facing each other in the first direction DR1. In particular, the first sensor parts included in the first touch sensor and the nth first touch sensor may have shapes different from those of the first sensor parts included in the second first touch sensor to the (n−1)th first touch sensor.

For example, the first sensor parts included in the first touch sensor and the nth first touch sensor may have the same shapes as some of the first sensor parts included in the second first touch sensor to the (n−1)th first touch sensor.

Also, the first touch sensor parts BR1 included in the first touch sensor and the nth first touch sensor may be spaced apart from each other in the first direction DR1 and disposed on edges of the active region AA.

Each of the second touch sensors is insulated from the first touch sensors and extends in the first direction DR1, and may have a shape arranged in the second direction DR2. Each of the second touch sensors may include a plurality of second sensor parts TE2 and a plurality of second connecting parts BR2 connecting the second sensor parts TE2. For example, m number of the second touch sensors are provided and arranged in the second direction DR2. Here, m is a natural number. Hereinafter, the m second touch sensors are described as the second touch sensors.

According to an embodiment of the inventive concept, a first second touch sensor and mth second touch sensor among the m number of second touch sensors may be disposed closest to the peripheral region NAA. The first second touch sensor and the mth second touch sensor are disposed closest to the peripheral region NAA while facing each other in the second direction DR2. In particular, the second sensor parts included in the first second touch sensor and the mth second touch sensor may have shapes different from those of the second sensor parts included in the second second touch sensor to the (m−1)th second touch sensor.

For example, the second sensor parts included in the first second touch sensor and the mth second touch sensor may have the same shapes as some portions of the second sensor parts included in the second touch sensor to the (m−1)th second touch sensor.

Also, the second touch sensor parts BR2 included in the first second touch sensor and the mth second touch sensor may be spaced apart from each other in the second direction DR2 and disposed on edges of the active region AA.

According to an embodiment of the inventive concept, the touch sensing unit TS may be differently operated according to whether a touch pen PN (see FIG. 4) operates or not.

For example, when the touch pen PN operates, the touch sensing unit TS calculates a first electrostatic capacitance between the first touch sensors and the touch pen PN, and a second electrostatic capacitance between the second touch sensors and the touch pen PN. The touch sensing unit TS may detect a touch coordinate through the first and second electrostatic capacitances. This will be described in further detail with reference to FIG. 5B.

For example, when the body of a user rather than the touch pen PN contacts the touch sensing unit TS, the touch sensing unit TS may be operated through an electrostatic capacitive method in which the touch coordinate is detected through the electrostatic capacitance between the first touch sensors and the second touch sensors.

That is, the first sensor parts TE1 may output sensing signals, and the plurality of second sensor parts TE2 may receive driving signals. Here, the touch sensing unit TS may scan the active region AA by applying driving signals to the second sensor parts TE2, and may detect a region on which a touch is applied through the sensing signals output from the plurality of first sensor parts TEL In another example, the first sensor parts TE1 may also receive driving signals, and the second sensor parts TE2 may also output sensing signals and may further receive or output other electrical signals.

However, such operation is merely an example. The touch sensing unit TS may detect an external touch through various other methods such as a resistive film method, an optical method, an ultrasonic method, a coordinate recognition method, or the like, and may have a corresponding electrode structure.

A plurality of signal lines and a plurality of pads PD may be disposed in the peripheral region NAA. According to the descriptions of the inventive concept, for convenience in description, a portion of the first signal lines W11, W12 and W13 and a portion of the second signal lines W21, W22 and W23 are illustrated. Ends of the first signal lines W11, W12 and W13 are respectively connected to the second touch sensors, and opposing ends of the second signal lines W21, W22 and W23 are respectively connected to the first touch sensors. Signal lines (not shown) from among the plurality of signal lines may be respectively connected to the corresponding electrodes from among the first and second touch sensors.

A pad region PA may be defined in a portion of the peripheral region NAA. The pads PD are disposed in the pad region PA. The touch sensing unit TS may be connected to a power supply (not shown) and a driving circuit (not shown) through the pads PD. Also, the pads PD include a plurality of first pads PD11, PD12 and PD13 and a plurality of second pads PD21, PD22 and PD23. For convenience in description, some pads are not illustrated.

Ends of the first signal lines W11, W12 and W13 are respectively connected to the first pads PD11, PD12 and PD13. Likewise, ends of the second signal lines W21, W22 and W23 are respectively connected to the second pads PD21, PD22 and PD23.

Referring to FIGS. 5B and 5C, a touch coordinate detection method of a touch sensing unit TS when a touch pen PN is used will be described.

Specifically, as illustrated in FIG. 5B, first sensor parts TE1$a$ and first connecting parts BR1$a$ included in the first touch sensor, and first sensor parts TE1$b$ and first connecting parts BR1$b$ included in the second first touch sensor are illustrated. In addition, second sensor parts TE2$a$ and second connecting parts BR2$a$ included in the first second touch sensor, and second sensor parts TE2$b$ and second connecting parts BR2$b$ included in the second touch sensor are illustrated.

According to an embodiment of the inventive concept, the same detection signals may be provided to the first and second touch sensors. Here, the detection signals may be ground voltage. However, the embodiment of the inventive concept is not limited thereto, and the detection signal may be set so as to have a voltage level different from a voltage level provided to the detecting part DT of the touch pen PN. Hereinafter, the voltage level provided to the detecting part DT is described as being greater than that of the detection signal.

In addition, the touch sensing unit TS may detect the amount of change in voltage/current of the detection signal provided to the first and second touch sensors. As such, the touch sensing unit TS may recognize a touch coordinate on the basis of the amount of change in voltage/current of the detection signal provided to the first and second touch sensors.

For example, it is assumed that a touch coordinate Po illustrated in FIG. 5B is touched by the touch pen PN.

First, as the detecting part DT of the touch pen PN approaches the touch coordinate Po, the voltage level of the detecting signal detected from the first sensor parts TE1*a* and TE1*b* may be changed. In this case, as illustrated in FIG. 5C, the electrostatic capacitance between the detecting part DT and the first sensor parts TE1*a* may be greater than that between the detecting part DT and the first sensor parts TE1*b*. As a result, the touch sensing unit TS may determine that the touch coordinate Po approaches closer to the first sensor parts TE1*a* than to the second first sensor parts TE1*b*.

Also, as illustrated in FIG. 5C, the electrostatic capacitance between the detecting part DT and the second sensor parts TE2*b* may be greater than that between the detecting part DT and the second sensor parts TE2*a*. As a result, the touch sensing unit TS may determine that the touch coordinate Po approaches closer to the first second sensor parts TE2*a* than to the second sensor parts TE2*b*.

Accordingly, the touch sensing unit TS may determine that the touch coordinate Po is recognized in a second region B2 from among first to fourth regions B1 to B4.

According to the above description, in the sensing unit TS according to the inventive concept, the connecting parts BR1 and BR2, and the sensor parts TE1 and TE2 connected through the connecting parts BR1 and BR2, may be disposed on the vicinity of the edges of the active region AA. Consequently, the touch sensing unit TS may readily detect the touch coordinate even when the vicinity of the edges of the active region AA is touched by the touch pen PN.

Figure 6A:
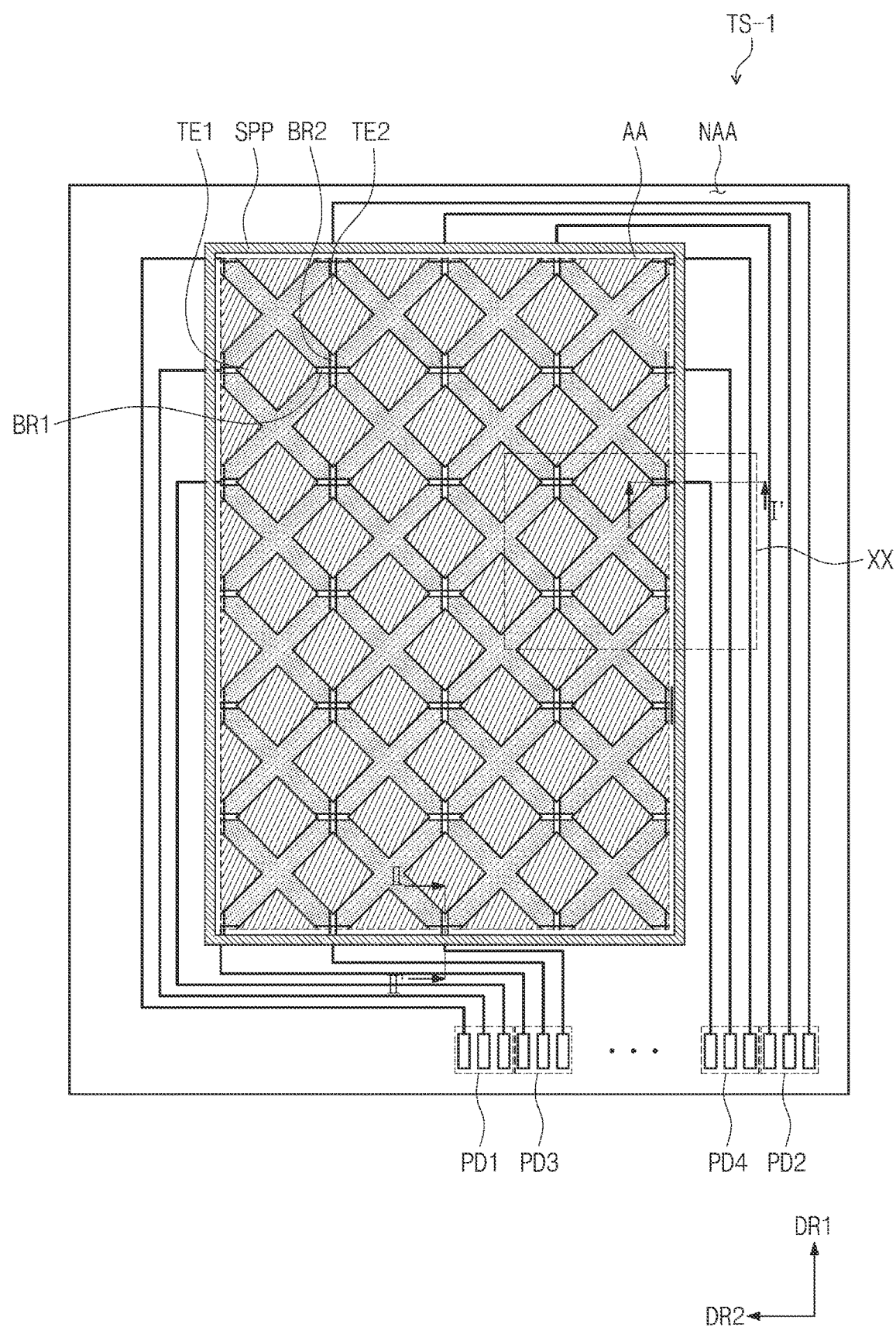
FIG. 6A is a plan view of a touch sensing unit according to another embodiment of the inventive concept.
Figure 6B:
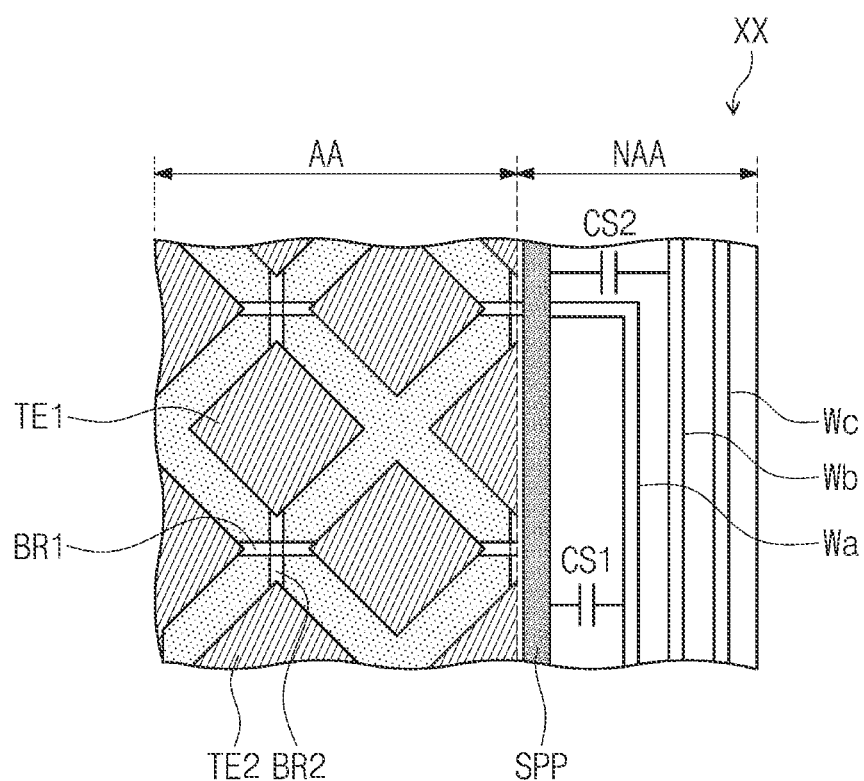
FIG. 6B is an enlarged view of region XX illustrated in FIG. 6A.

FIG. 6A is a plan view of a touch sensing unit according to another embodiment of the inventive concept. FIG. 6B is an enlarged view of region XX illustrated in FIG. 6A.

In comparison with the touch sensing unit TS illustrated in FIG. 5A, a touch sensing unit TS-1 illustrated in FIG. 6A may be only different in the configuration of its blocking electrode SPP, signal lines, and pads PD, but the remaining configuration may be substantially the same. Accordingly, descriptions of the remaining configuration will not be provided.

Referring to FIGS. 6A and 6B, the touch sensing unit TS-1 may include a blocking electrode SPP which prevents the occurrence of coupling between the first touch sensors and the signal lines or between the second touch sensors and the signal lines.

According to an embodiment of the inventive concept, the blocking electrode SPP may include a conductive material. For example, the blocking electrode SPP may include any one of indium tin oxide (ITO), indium zinc oxide (IZO), zinc oxide (ZnO), indium tin zinc oxide (ITZO), PEDOT, or a metal. Here, the metal may include molybdenum, silver, titanium, copper, aluminum, and alloys thereof.

The blocking electrode SPP may be disposed in a peripheral region NAA adjacent to an active region AA. According to an embodiment, the blocking electrode SPP may be disposed in a peripheral region NAA to surround the active region AA. However, the embodiment of the inventive concept is not limited thereto, and the blocking electrode SPP may be disposed in the peripheral region NAA adjacent to the active region AA through various methods. For example, the blocking electrode SPP may be disposed in the peripheral region NAA adjacent to ends of the signal lines connected to sensor parts TE1 and TE2.

In addition, according to an embodiment of the inventive concept, the touch sensing unit TS-1 may include first to fourth signal lines. That is, the first to fourth signal lines may be respectively connected to two ends of each of the first and second touch sensors. Detection signals may be respectively provided to two ends of each of the first and second touch sensors through the first to fourth signal lines. As a result, a uniform detection signal may be provided to the first sensor parts TE1 of the first touch sensors and the second sensor parts TE2 of the second touch sensors.

Specifically, one end of each first signal line is connected to a first pad part PD1 and the other end of each first signal line is connected to a first touch sensor. One end of each second signal line is connected to a second pad part PD2 and the other end of each second signal line is connected to one of the first touch sensors.

One end of each third signal lines is connected to a third pad part PD3 and the other end of each third signal line is connected to one of the second touch sensors. One end of each fourth signal line is connected to a fourth pad part PD4 and the other end of each fourth signal line is connected to one of the second touch sensors. For convenience in description, some pads are not illustrated.

In this case, the blocking electrode SPP may be disposed in the peripheral region NAA to surround the active region AA. The blocking electrode SPP blocks the occurrence of coupling between the first to fourth signal lines and the first touch sensors, or between the first to fourth signal lines and the second touch sensors.

As illustrated in FIG. 6B, first to third signal lines Wa, Wb and Wc which are connected to the fourth pad part PD4 are exemplarily illustrated. When a detection signal is provided to the first to third signal lines Wa, Wb and Wc through the fourth pad parts PD4, coupling may occur between the first to third signal lines Wa, Wb and Wc and the sensor parts TE1 and TE2.

However, in the touch sensing unit TS-1 according to the inventive concept, the blocking electrode SPP is disposed in the peripheral region NAA adjacent to the active region AA. That is, the blocking electrode SPP may be disposed in the peripheral region NAA adjacent to the first to third signal lines Wa, Wb and Wc. As an example, a first coupling CS1 is formed between the first signal line Wa and the blocking electrode SPP. As an example, a second coupling CS2 is formed between the second signal line Wb and the blocking electrode SPP. As a result, coupling between the first to third signal lines Wa, Wb and Wc and the sensor parts TE1 and TE2 may be prevented.

Figure 7A:
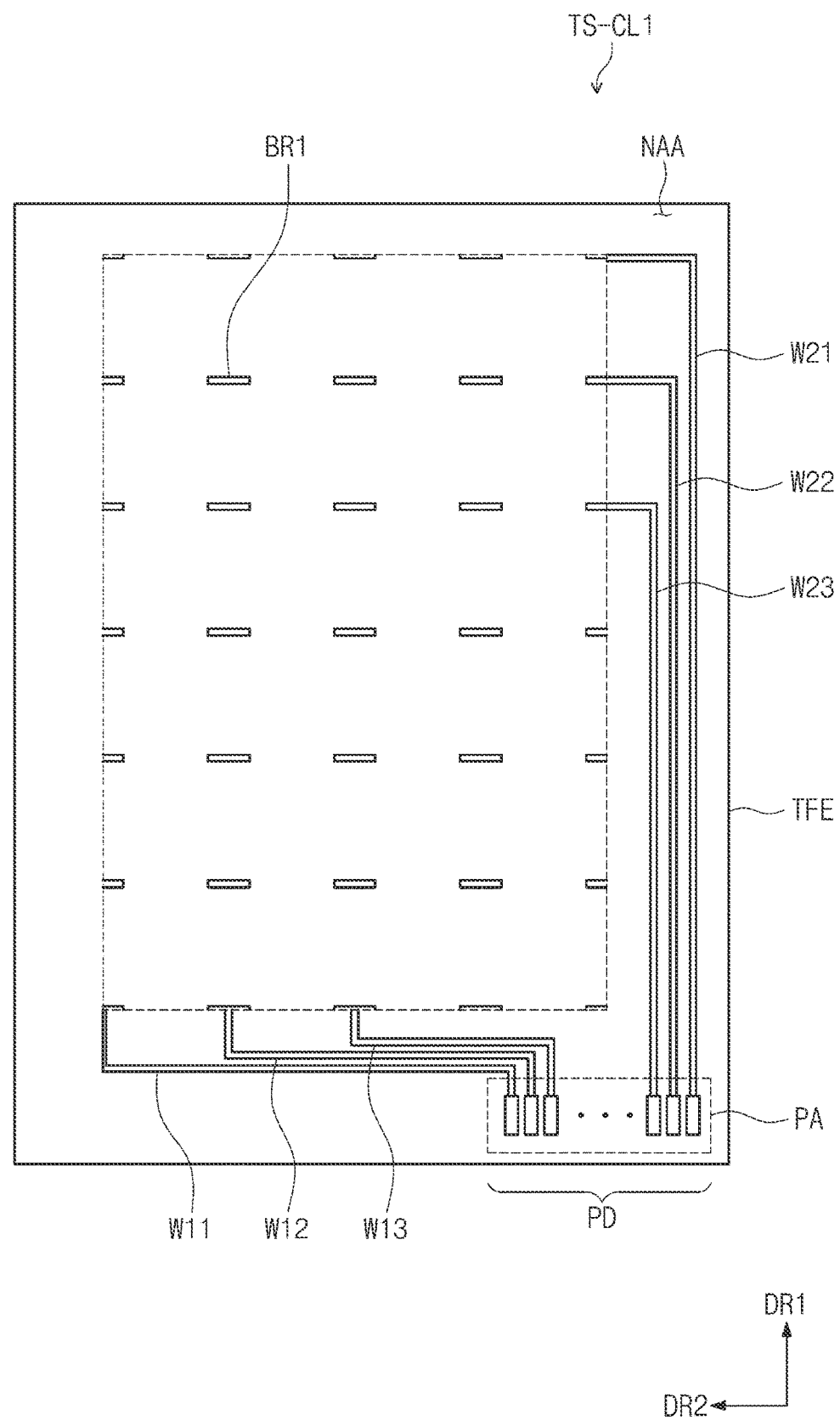
FIG. 7A is a plan view illustrating a first pattern layer of the touch sensing unit illustrated in FIG. 6A.
Figure 7B:
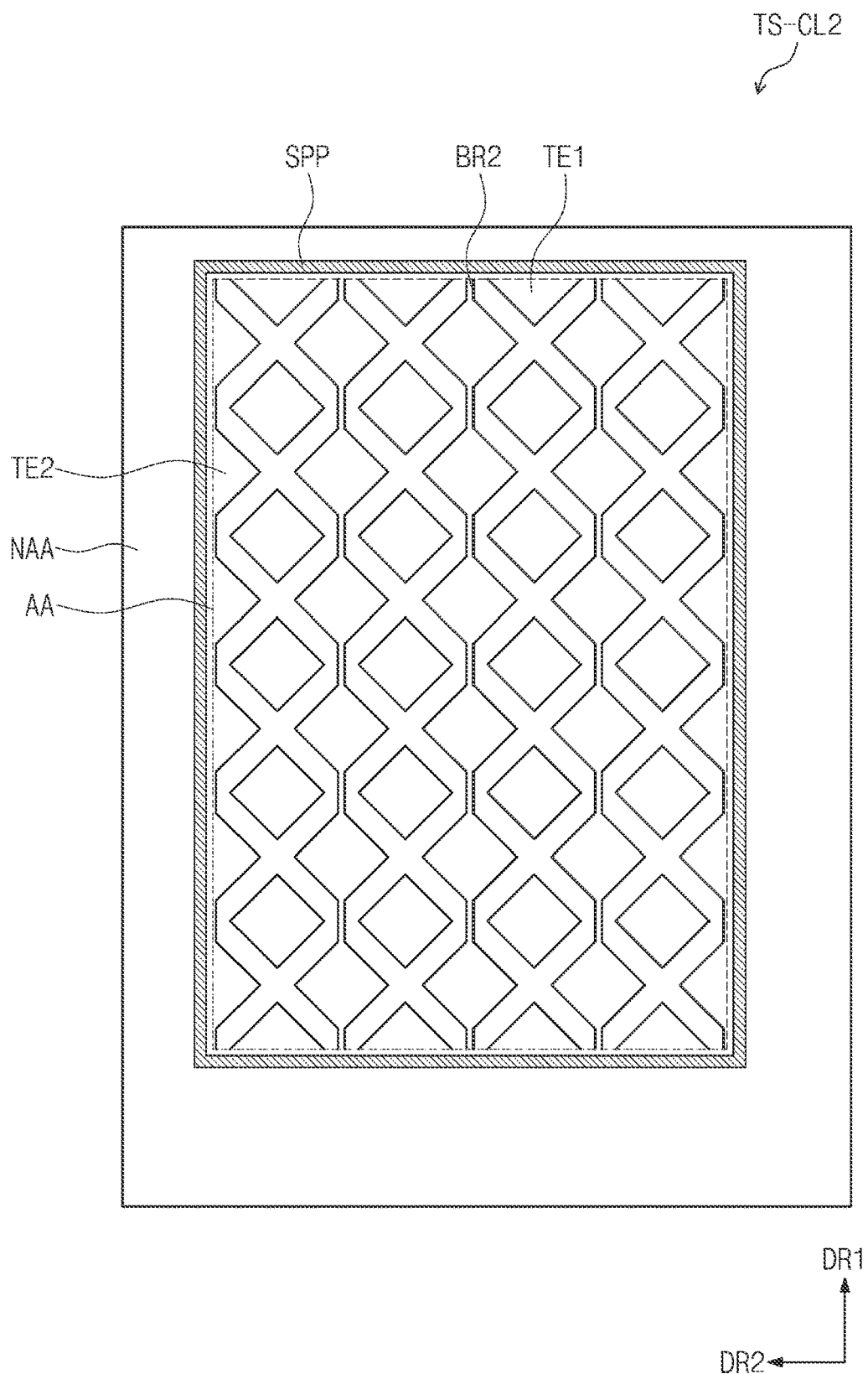
FIG. 7B is a plan view illustrating a second pattern layer of the touch sensing unit illustrated in FIG. 6A.
Figure 8A:
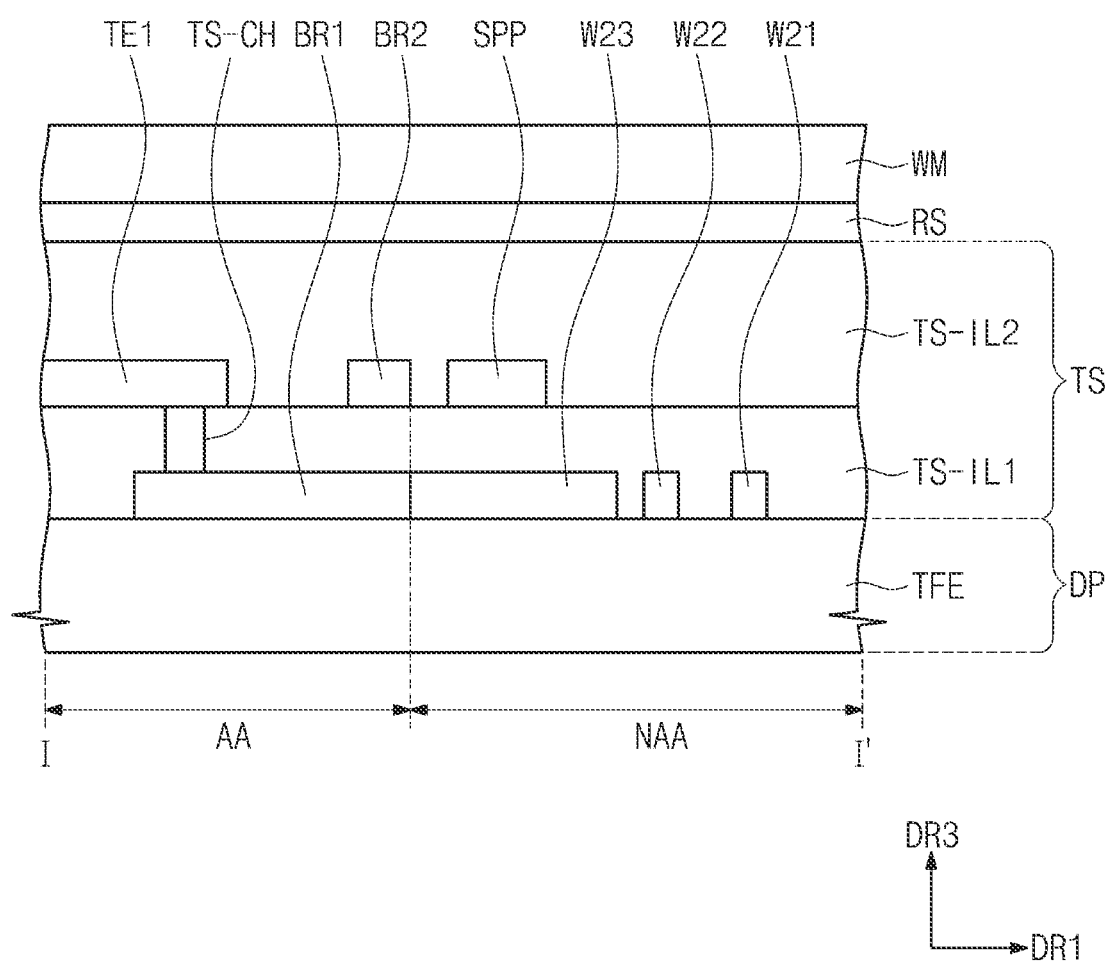
FIG. 8A is a cross-sectional view taken along line I-I' of FIG. 6A according to an embodiment of the inventive concept.
Figure 8B:
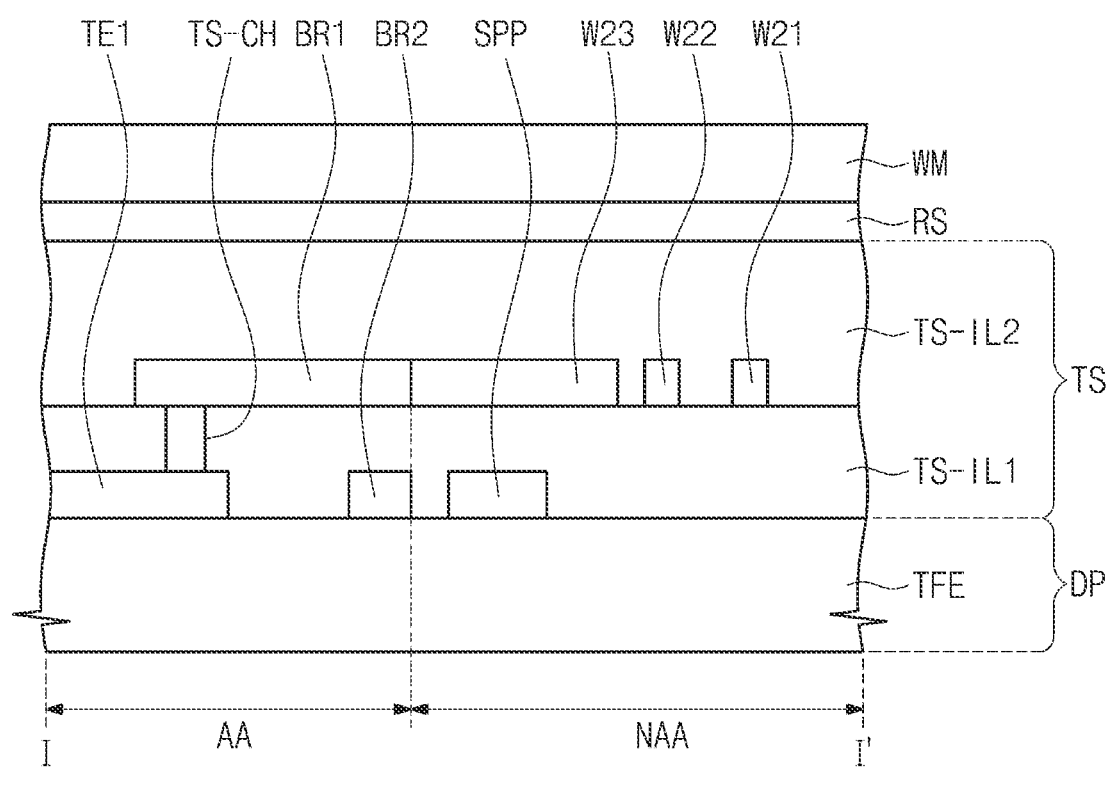
FIG. 8B is a cross-sectional view taken along line I-I' of FIG. 6A according to another embodiment of the inventive concept.
Figure 8C:
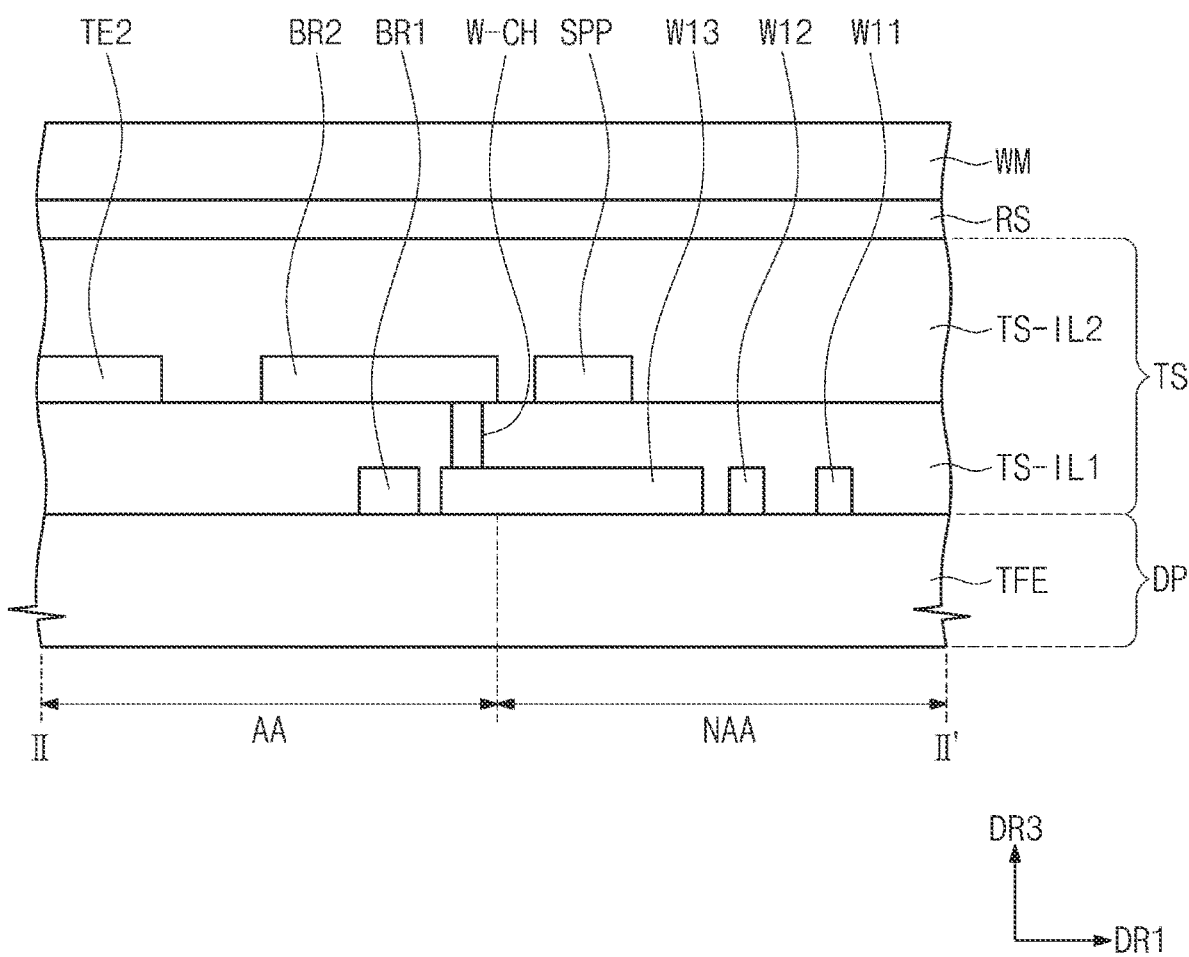
FIG. 8C is a cross-sectional view illustrating a connecting structure between first connecting parts and signal lines according to an embodiment of the inventive concept.

FIG. 7A is a plan view illustrating a first conductive layer of the touch sensing unit illustrated in FIG. 6A. FIG. 7B is a plan view illustrating a second conductive layer of the touch sensing unit illustrated in FIG. 6A. FIG. 7C is a cross-sectional view showing the first and second conductive layers of the touch sensing unit according to another embodiment of the inventive concept. FIG. 8A is a cross-sectional view taken along line I-I' of FIG. 6A according to an embodiment of the inventive concept. FIG. 8B is a cross-sectional view taken along line I-I' of FIG. 6A according to another embodiment of the inventive concept. FIG. 8C is a cross-sectional view illustrating a connecting structure between first connecting parts and signal lines according to an embodiment of the inventive concept.

As described above in FIG. 4, the touch sensing unit TS may include the first conductive layer TS-CL1 and the second conductive layer TS-CL2. In particular, the touch sensing unit TS may be directly disposed on the display panel DP. That is, the first conductive layer TS-CL1 is disposed directly on the encapsulating substrate TFE. The first insulating layer TS-IL1 may be disposed on the first conductive layer TS-CL1, and the second conductive layer TS-CL2 may be disposed on the first insulating layer TS-ILL Also, as described above, FIG. 6A describes that the first conductive layer TS-CL1 includes first to fourth signal lines connected to the first to fourth pad regions PD1 to PD4. However, FIG. 7A describes that the first conductive layer TS-CL1 includes the third and fourth signal lines of the first to fourth signal lines connected to the third and fourth pad regions PD3 and PD4 shown in FIG. 6A. That is, the first and second signal lines connected to the first and second pad regions PD1 to PD2 may be omitted.

Referring to FIGS. 7A, 7B, 7C, and 8A, cross-sectional views of a touch sensing unit TS according to an embodiment of the inventive concept are illustrated. Specifically, first conductive layer TS-CL1 may include first connecting parts BR1 of first touch sensors, signal lines W11 to W13 and W21 to W23, and pads PD. That is, the first connecting parts BR1, the signal lines W11 to W13 and W21 to W23, and the pads PD may be disposed on an encapsulating substrate TFE. As illustrated in FIG. 8A, pads PD are not provided, and only a portion of signal lines from among the signal lines W11 to W13 and W21 to W23 is disclosed for simplicity in explanation.

A first insulating layer TS-IL1 may be disposed on the first conductive layer TS-CL1 so as to cover the first connecting parts BR1, the signal lines W11 to W13 and W21 to W23, and the pads PD. In addition, touch contact holes TS-CH which expose at least a portion of first sensor parts TE1 may be defined in the first insulating layer TS-IL1.

The first connecting parts BR1 are connected to the first sensor parts TE1 through the touch contact holes TS-CH. In addition, the first connecting parts BR1 may be directly connected to the signal lines W21 to W23 respectively and provide an electrical signal to the first sensor parts TEL A second conductive layer TS-CL2 may include first sensor parts TE1, second sensor parts TE2, second connecting parts BR2, and a blocking electrode SPP. That is, the first sensor parts TE1, the second sensor parts TE2 of the second touch sensors, the second connecting parts BR2, and the blocking electrode SPP are disposed on the first insulating layer TS-IL1.

As described above, the first sensor parts TE1, the second sensor parts TE2 and the second connecting parts BR2 are disposed on a layer different from that on which the first connecting parts BR1 and the signal lines W11 to W13 and W21 to W23 are disposed.

A second insulating layer TS-IL2 may be disposed on the second conductive layer TS-CL2 so as to cover the first sensor parts TE1, second sensor parts TE2, second connecting parts BR2, and the blocking electrode SPP.

A window member WM may be disposed on the second insulating layer TS-IL2. An adhesive layer RS may be disposed between the second insulating layer TS-IL2 and the window member WM. For example, the adhesive layer RS may be a resin.

Referring to FIG. 8B, cross-sectional views of a touch sensing unit TS according to another embodiment of the inventive concept are illustrated. The touch sensing unit TS shown in FIG. 8B is different from the touch sensing unit shown in FIG. 8A in that the first sensor parts TE1, the second sensor parts TE2, and the second connecting parts BR2 are disposed on the encapsulating substrate TFE. The first connecting parts BR1 and the signal lines W11 to W13 and W21 to W23 are disposed on the first insulating layer TS-IL1.

A first conductive layer TS-CL1 may include first sensor parts TE1, second sensor parts TE2, second connecting parts BR2, and a blocking electrode SPP. That is, the first sensor parts TE1, the second sensor parts TE2, the second connecting parts BR2, and the blocking electrode SPP are disposed on the encapsulating layer TFE.

A second conductive layer TS-CL2 may include first connecting parts BR1, signal lines W11 to W13 and W21 to W23, and pads PD. That is, the first connecting parts BR1, the signal lines W11 to W13 and W21 to W23, and the pads PD may be disposed on a first insulating layer TS-ILL As described above, the blocking electrode SPP may be disposed on a layer different from that on which the signal lines are disposed, and may prevent the occurrence of coupling between the signal lines and the sensor parts. The touch sensing unit TS shown in FIG. 7C is different from the touch sensing unit shown in FIGS. 7A and 7B in that the first sensor parts TE1, the second sensor parts TE2, the second connecting parts BR2, and the blocking electrode SPP are disposed on the encapsulating substrate TFE. Also, the first connecting parts BR1 and the first to third signal wirings W21, W22 and W23 are disposed on the first insulation layer TS-ILL The first connecting parts BR1 connect the first sensor parts TE1 through the touch contact holes TS-CH. The first to third signal lines W21, W22 and W23 are also connected to the first sensor parts TE1 through the contact holes defined in the first insulating layer TS-IL1.

Referring to FIG. 8C, signal lines W11 to W13 and W21 to W23 may be directly connected to second connecting parts BR2. In this case, a wiring contact hole W-CH for connecting the signal lines W11 to W13 and W21 to W23 and the second connecting parts BR2 may be defined in a first insulating layer TS-ILL According to embodiments of the inventive concept, connection parts connecting the sensor parts may be disposed adjacent to a peripheral region. Thus, reliability of touch detection may be improved in the vicinity of an edge in the active region.

Hitherto, the best mode was disclosed in the drawings and specification. While specific terms were used, they were not used to limit the meaning or the scope of the present invention described in Claims, but merely used to explain the present invention. Accordingly, a person having ordinary skill in the art will understand from the above that various modifications and other equivalent embodiments are also possible. Hence, the real protective scope of the present invention shall be determined by the technical scope of the accompanying Claims. Various features of the above described and other embodiments can be mixed and matched in any manner, to produce further embodiments consistent with the invention.

What is claimed is:

1. A display device comprising:
a display panel comprising a plurality of pixels; and
a touch sensing unit including an active region overlapping the pixels in a plan view and a peripheral region disposed adjacent to the active region,
wherein the touch sensing unit comprises:
a plurality of first touch sensors including a first first touch sensor and a second first touch sensor spaced apart from each other in a first direction, each of the plurality of first touch sensors extending in a second direction crossing the first direction, and
a plurality of second touch sensors comprises a first second touch sensor and a second second touch sensor spaced apart from each other in the second direction, each of the plurality of second touch sensors extending in the first direction,
wherein the touch sensing unit comprises a plurality of regions configured to detect a detecting part and the plurality of regions respectively overlap different portions of the plurality of first touch sensors and the plurality of second touch sensors from each other, wherein, in case the detecting part approaches one of the plurality of regions which overlaps the first first touch sensor, an electrostatic capacitance between the detecting part and the first first touch sensor may be greater than that between the detecting part and the second first touch sensor, wherein each of the plurality of first touch sensors comprises a plurality of first sensor parts and a plurality of first connecting parts electrically connected to the plurality of first sensor parts, wherein each of the plurality of second touch sensors comprises a plurality of second sensor parts and a plurality of second connecting parts electrically connected to the second sensor parts, wherein the plurality of regions comprises:

a first region overlapping one of the first sensor parts of the first first touch sensor and one of the second sensor parts of the first second touch sensor;

a second region adjacent to the first region in the second direction, and the second region overlapping the one of the first sensor parts of the first first touch sensor and one of the second sensor parts of the second second touch sensor;

a third region adjacent to the first region in the first direction, and the third region overlapping the one of the second sensor parts of the first second touch sensor and one of the first sensor parts of the second first touch sensor; and a fourth region adjacent to the second region in the first direction, and the fourth region overlapping the one of the first sensor parts of the second first touch sensor and the one of the second sensor parts of the second second touch sensor, and wherein, in case the detecting part approaches one of the plurality of regions, the electrostatic capacitance between the detecting part and a sensor part overlapping the one of the plurality of regions is greater than that between the detecting part and a sensor part non-overlapping the one of the plurality of regions.

2. The display device of claim 1, wherein, in case the detecting part approaches the second region and the detecting part is closer to the one of the first sensor parts of the first first touch sensor than the one of the second sensor parts of the second second touch sensor, the electrostatic capacitance between the detecting part and the first sensor part of the first first touch sensor is greater than that between the detecting part and the first sensor part of the second first touch sensor.

3. The display device of claim 1, wherein, in case the detecting part approaches the second region and the detecting part is closer to the one of the second sensor parts of the second second touch sensor than the one of the first sensor parts of the first first touch sensor, the electrostatic capacitance between the detecting part and the second sensor part of the second second touch sensor is greater than that between the detecting part and the second sensor part of the first second touch sensor.

4. The display device of claim 1, wherein the one of the first sensor parts of the first first touch sensor is connected to one of the plurality of first connecting parts of the first first touch sensor, wherein the one of the first sensor parts of the second first touch sensor is connected to one of the plurality of first connecting parts of the second first touch sensor, wherein the one of the second sensor parts of the first second touch sensor is connected to one of the plurality of second connecting parts of the first second touch sensor, and wherein the one of the second sensor parts of the second second touch sensor is connected to one of the plurality of second connecting parts of the second second touch sensor.

5. The display device of claim 4, wherein the one of the plurality of first connecting parts of the first first touch sensor crosses the one of the plurality of second connecting parts of the first second touch sensor or the one of the plurality of second connecting parts of the second second touch sensor.

6. The display device of claim 1, further comprising an insulating layer disposed between the plurality of first connecting parts and the plurality of second connecting parts, and a plurality of signal lines comprising a first signal line connected to the first touch sensor and a second signal line insulated from the first signal line and connected to the second touch sensor, wherein one of the plurality of first connecting parts overlaps one of the plurality of second connecting parts, and wherein the first signal line is disposed on the same layer as the one of the plurality of first connecting parts and connected to the one of the plurality of first connecting parts not through any one of the plurality of first sensor parts and the plurality of second sensor parts.

7. The display device of claim 6, wherein the one of the plurality of first connecting parts and the one of the plurality of second connecting parts are disposed in the active region, and a first signal line is disposed in the peripheral region.

8. The display device of claim 7, wherein the one of the plurality of first connecting parts and the first signal line are directly connected to each other.

9. The display device of claim 8, wherein the plurality of first sensor parts are connected to the plurality of first connecting parts through contact holes formed in the insulating layer.

10. The display device of claim 6, wherein one side of the one of the plurality of first connecting parts is connected to the first signal line and the other side of the one of the plurality of first connecting parts is connected to one of the plurality of first sensor parts.

11. The display device of claim 1, wherein the plurality of first connecting parts are arranged along a boundary line between the active region and the peripheral region.

12. The display device of claim 11, wherein the boundary line extends along the second direction.

13. The display device of claim 1, wherein the plurality of second connecting parts are arranged along a boundary line between the active region and the peripheral region.

14. The display device of claim 12, wherein the boundary line extends along the first direction.

* * * * *